US 6,661,919 B2

(12) United States Patent
Nicholson et al.

(10) Patent No.: US 6,661,919 B2
(45) Date of Patent: Dec. 9, 2003

(54) METHOD AND APPARATUS FOR PRODUCING A HYBRID DATA STRUCTURE FOR DISPLAYING A RASTER IMAGE

(75) Inventors: Dennis G. Nicholson, Atherton, CA (US); James C. King, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 10/054,944

(22) Filed: Jan. 25, 2002

(65) Prior Publication Data
US 2002/0067859 A1 Jun. 6, 2002

Related U.S. Application Data

(63) Continuation of application No. 09/334,524, filed on Jun. 15, 1999, which is a continuation of application No. 08/736,250, filed on Oct. 24, 1996, now Pat. No. 5,999,649, which is a continuation of application No. 08/298,655, filed on Aug. 31, 1994, now Pat. No. 5,625,711.

(51) Int. Cl.[7] .............................. G06K 9/34; G06K 9/64; G06F 15/00
(52) U.S. Cl. ....................... 382/173; 382/217; 382/177; 382/180; 707/509; 707/514
(58) Field of Search ................................. 382/171, 173, 382/177, 180, 181, 217, 258, 276; 707/509, 510, 514, 516, 526, 542

(56) References Cited

U.S. PATENT DOCUMENTS

| 3,806,871 A | 4/1974 | Shepard |
| 4,091,424 A | 5/1978 | Widergren |
| 4,186,413 A | 1/1980 | Mortimer |

(List continued on next page.)

FOREIGN PATENT DOCUMENTS

| DE | 0 006 131 | 5/1979 |
| EP | 0 024 521 | 1/1984 |

(List continued on next page.)

OTHER PUBLICATIONS

"Word Perfect Envoy 1.0a," WP Corp., White Paper, WWW, Dec. 13, 1995.
"Common Ground Version 2.0," Common Ground Software, Inc., White Paper, 222. Dec. 13, 1995.

(List continued on next page.)

Primary Examiner—Andrew W. Johns
Assistant Examiner—Amir Alavi
(74) Attorney, Agent, or Firm—Fish & Richardson P.C.

(57) ABSTRACT

A system for producing a raster image derived from coded and non-coded portions of a hybrid data structure from an input bitmap including (1) a data processing apparatus, (2) a recognizer which performs recognition on an input bitmap to the data processing apparatus to detect identifiable objects within the input bitmap, (3) a mechanism for producing a hybrid data structure including coded data corresponding to the identifiable objects and non-coded data derived from portions of the input bitmap which do not correspond to the identifiable objects, and (4) an output device capable of developing a visually perceptible raster image derived from the hybrid data structure. The raster image includes raster images of the identifiable objects and raster images derived from portions of the input bitmap that do not correspond to the identifiable objects. The invention includes a method for producing a hybrid data structure for a bitmap of an image having the steps of: (1) inputting a signal comprising a bitmap into a digital processing apparatus, (2) partitioning the bitmap into a hierarchy of lexical units, (3) assigning labels to a label list for each lexical unit of a predetermined hierarchical level, where labels in the label list have an associated confidence level, and (4) storing each lexical unit in a hybrid data structure as either an identifiable object or a non-identifiable object.

17 Claims, 16 Drawing Sheets

U.S. PATENT DOCUMENTS

| | | |
|---|---|---|
| 4,707,801 A | 11/1987 | Barnes et al. |
| 4,723,209 A | 2/1988 | Hernandez et al. |
| 4,879,753 A | 11/1989 | El-Sherbini |
| 4,907,285 A | 3/1990 | Nakano et al. |
| 4,914,709 A | 4/1990 | Rudak |
| 4,974,260 A | 11/1990 | Rudak |
| 4,985,863 A | 1/1991 | Fujisawa et al. |
| 5,020,112 A | 5/1991 | Chou |
| 5,086,497 A | 2/1992 | Horikawa et al. |
| 5,146,552 A | 9/1992 | Cassorla et al. |
| 5,159,667 A | 10/1992 | Borrey et al. |
| 5,455,871 A * | 10/1995 | Bloomberg et al. ......... 382/173 |
| 5,455,875 A | 10/1995 | Chevion et al. |
| 5,475,805 A | 12/1995 | Murata |
| 5,542,006 A * | 7/1996 | Shustorovich et al. ...... 382/156 |
| 5,581,682 A | 12/1996 | Anderson et al. |
| 5,590,317 A * | 12/1996 | Iguchi et al. ............... 382/173 |
| 5,625,711 A | 4/1997 | Nicholson et al. |
| 5,689,717 A | 11/1997 | Pritt |
| 5,737,733 A * | 4/1998 | Eller ......................... 707/101 |
| 5,748,807 A * | 5/1998 | Lopresti et al. ............ 382/310 |
| 5,832,474 A | 11/1998 | Lopresti et al. |
| 5,848,184 A * | 12/1998 | Taylor et al. ............... 382/173 |
| 5,857,212 A | 1/1999 | Van De Vanter |
| 5,873,111 A | 2/1999 | Edberg |
| 5,893,125 A | 4/1999 | Shostak |
| 5,926,565 A * | 7/1999 | Froessl ....................... 382/181 |
| 5,999,649 A | 12/1999 | Nicholson et al. |
| 6,038,342 A * | 3/2000 | Bernzott et al. ............ 382/173 |

FOREIGN PATENT DOCUMENTS

| | | |
|---|---|---|
| EP | 0 098 958 | 1/1984 |
| EP | 0 415 373 | 3/1991 |
| EP | 0 539 106 | 4/1993 |
| WO | WO 94/06241 | 3/1994 |

OTHER PUBLICATIONS

"TrueDoc Software Development Kit," Bitstream Corp., White Paper, www. Dec. 13, 1995.

Iwaki, Osamu et al., "A Segmentation Method Based on Office Document Hierarchial Structure," IEEE 1987, pp. 759–763.

* cited by examiner

CONCLUSION

To the sick the doctors wisely recommend a change of air and scenery. Thank Heaven, here is not all the world. The buck-eye does not grow here in New England, and the mocking-bird is rarely heard here. The wild-goose is more of a cosmopolite than we; he breaks his fast in Canada, takes a luncheon in the Ohio, and plumes himself for the night in a southern bayou. Even the bison, to some extent, keeps pace with the seasons, > "...be a Columbus to whole new continents and worlds within you, opening new channels, not of trade, but of thought."

cropping the pastures of the colorado only till a greener and sweeter grass awaits him by the Yellowstone. Yet we think that if rail fences are pulled down, and stone-walls piled up on out farms, bounds are henceforth set to our lives and our fates decided. If you are chosen town-clerk, forsooth, you cannot go to Tierra del Fuego this summer: but you may go to the land of infernal fire nevertheless. The universe is wider than our views of it.

Yet we should oftener look over the tafferel of our craft, like curious passengers, and not make the voyage like stupid sailors picking oakum. The other side of the globe is but the home of our correspondent. Our voyaging is only great circle sailing, and the doctors prescribe for diseases of the skin merely. One hastens to Southern Africa to chase the giraffe; but surely that is not the game he would be after. How long, pray, would a man hunt giraffes if he could? Snipes and woodcocks also may afford rare sport; but I trust it would be nobler game to shoot one's self.-

> "Direct your eye right inward, and you'll find
> A thousand regions in your mind
> Yet undiscovered. Travel them, and be
> Expert in home-cosmography."

What does Africa,-what does the West stand for? Is not our own interior white on the chart? black though it may prove, like the coast, when discovered. Is it the source of the Nile, or the Niger, or the Mississippi, or a North-West Passage around this continent, that we would find? Are these the problems which most concern mankind? Is Franklin the only man who is lost, that his wife should be so earnest to find him? Does Mr. Grinnel know where he himself is? Be rather the Mungo Park, the Lewis and Clarke and Frobisher, of your own streams and oceans, explore your own higher latitudes, -with shiploads of preserved meats to support you, if they be necessary; and pile the empty cans sky-high for a sign. Were preserved meats invented to preserve meat merely? Nay, be a Columbus to whole new continents and worlds within you, opening new channels, not of trade, but of thought. Every man is the lord of a realm beside which the earthly empire of

*Figure 3*

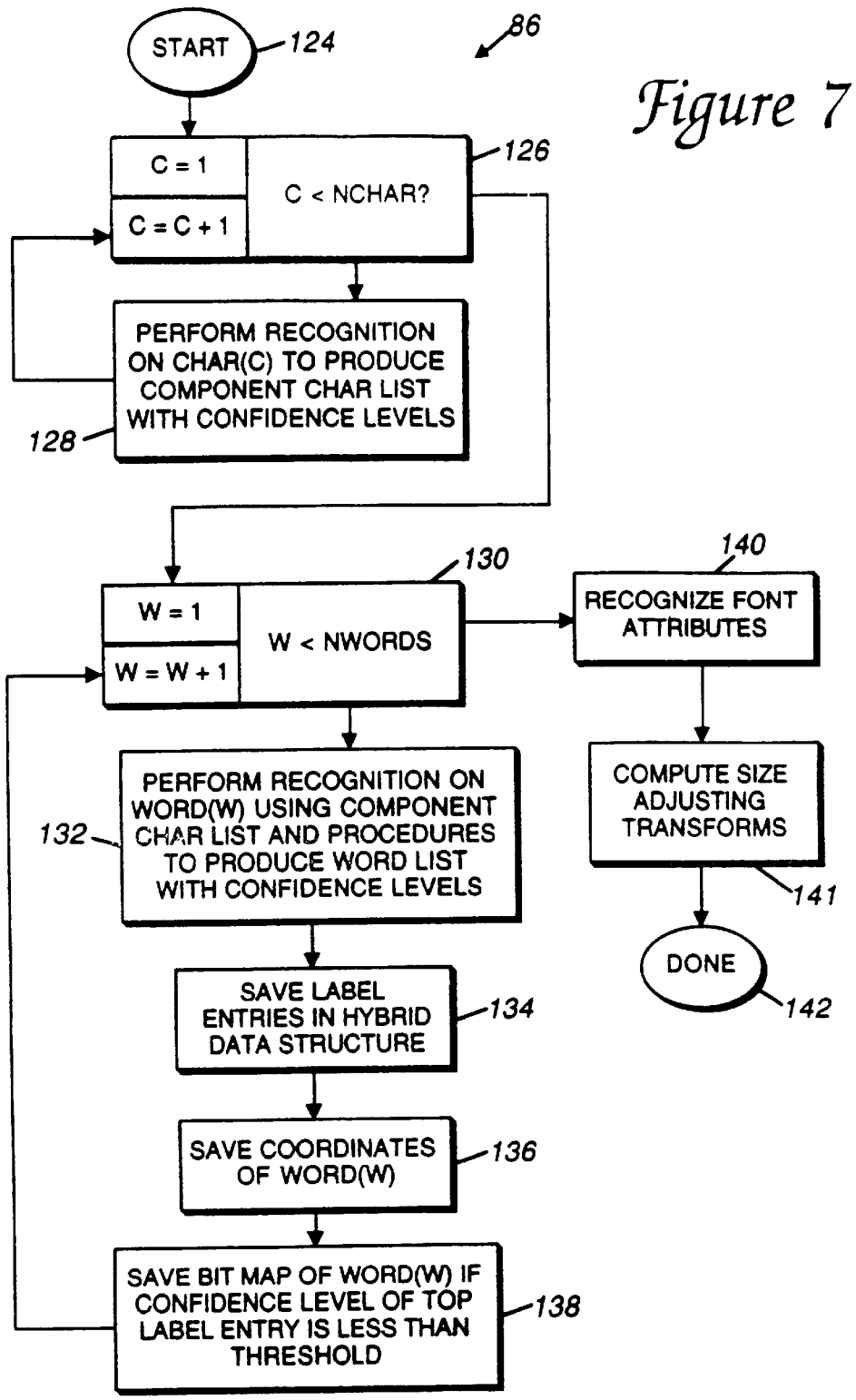

Figure 7a

| CHARACTER LABEL | CONFIDENCE LEVEL | IMPLIED CHARACTERS |
|---|---|---|
| O | 95 | 0, O, o |
| C | 4 | C, c |
| Q | 1 | Q |

Figure 7b

| WORD LABEL | CONFIDENCE LEVEL |
|---|---|
| OPen | 50 |
| 0Pen | 20 |
| oPen | 50 |
| Cpen | 27 |
| cPen | 25 |
| Qpen | 21 |
| Open | 95 |
| 0pen | 17 |
| open | 53 |

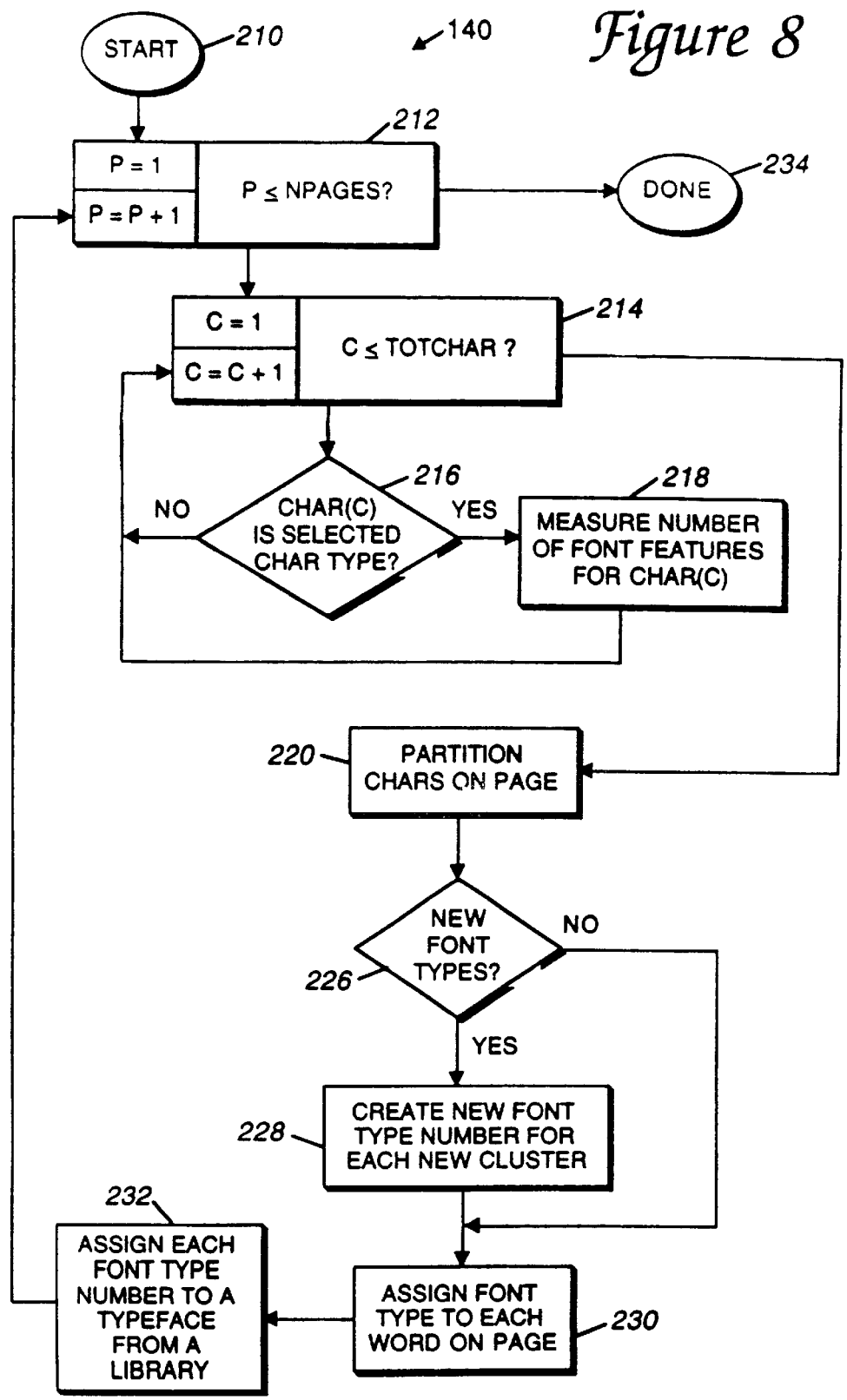

METHOD AND APPARATUS FOR PRODUCING A HYBRID DATA STRUCTURE FOR DISPLAYING A RASTER IMAGE

CROSS-REFERENCE TO RELATED APPLICATIONS

This application is a continuation of U.S. Ser. No. 09/334,524, filed Jun. 15, 1999; which is a continuation of Ser. No. 08/736,250, filed Oct. 24, 1996; now U.S. Pat. No. 5,999,649 which is a continuation of Ser. No. 08/298,655, filed Aug. 31, 1994, now issued as U.S. Pat. No. 5,625,711.

BACKGROUND OF THE INVENTION

The present invention relates generally to the display of digitally stored and/or processed images, and more particularly to a method and apparatus for displaying images on raster display devices such as laser printers and computer monitors.

Digital images can be efficiently stored, edited, printed, reproduced, and otherwise manipulated. It is therefore often desirable to convert an image, such as on a piece of paper, into a digital representation of the image by a process known as digitization. Digital representations of an image can be primitive and non-coded (e.g., an array of picture elements or "pixels") or may contain higher level descriptive coded information (e.g., ASCII character codes) from which a primitive representation may be generated. Generally, high level coded digital representations are more compact than primitive non-coded ones.

Optical character recognition (OCR) encompasses digitization and a method for transforming text in bitmap representation to a high level coded representation, such as ASCII character codes. In OCR digitization, text characters on a printed surface such as a sheet of paper are typically scanned by an optical scanner, which creates a bitmap of the pixels of the image. A pixel is a fundamental picture element of an image, and a bitmap is a data structure including information concerning each pixel of the image. Bitmaps, if they contain more than on/off information, are often referred to as "pixel maps."

Other types of processes can also digitize real-world images. Devices such as digital cameras can be used to directly create bitmaps corresponding to a captured image. A computer system can recreate the image from the bitmap and display it on a computer display or send the bitmap to a printer to be printed. Bitmap generators can be used to convert other types of image-related inputs into bitmaps which can be manipulated and displayed. Incoming facsimile (fax) data includes low-resolution bitmaps that can be manipulated, recognized, printed, etc.

Once a bitmap is input to a computer, the computer can perform recognition on the bitmap so that each portion or object of the input bitmap, such as a character or other lexical unit of text, is recognized and converted into a code in a desired format. The recognized characters or other objects can then be displayed, edited, or otherwise manipulated using an application software program running on the computer.

There are several ways to display a recognized, coded object. A raster output device, such as a laser printer or computer monitor, typically requires a bitmap of the coded object which can be inserted into a pixel map for display on a printer or display screen. A raster output device creates an image by displaying an array of pixels arranged in rows and columns from the pixel map. One way to provide the bitmap of the coded object is to store an output bitmap in memory for each possible code. For example, for codes that represent characters in fonts, a bitmap can be associated with each character in the font and for each size of the font that might be needed. The character codes and font size are used to access the bitmaps. However, this method is very inefficient in that it tends to require a large amount of peripheral and main storage. Another method is to use a "character outline" associated with each character code and to render a bitmap of a character from the character outline and other character information, such as size. The character outline can specify the shape of the character and requires much less memory storage space than the multitude of bitmaps representing many sizes. A commonly-used language to render bitmaps from character outlines is the PostScript® language by Adobe Systems, Inc. of Mountain View, Calif. Character outlines can be described in standard formats, such as the Type 1® format by Adobe Systems, Inc.

OCR processes are limited by, among other things, the accuracy of the digitized image provided to the computer system. The digitizing device (such as a scanner) may distort or add noise to the bitmap that it creates. In addition, OCR processes do not perfectly recognize bitmap images, particularly if they are of low resolution or are otherwise of low quality. For example, a recognizer might misread ambiguous characters, characters that are spaced too closely together, or characters of a font for which it had no information.

Imperfect recognition can present problems both at the time of editing a recognized image and when printing or displaying the image. Misrecognized images may be printed incorrectly, and images that are not recognized at all may not be printed at all, or may be printed as some arbitrary error image. This reduces the value of the OCR process, since the recognized document may require substantial editing.

SUMMARY OF THE INVENTION

The present invention provides a method and apparatus for creating a hybrid data structure describing recognized and unrecognized objects. The invention is applicable to recognizing text or other objects from a bitmap provided by an optical scanner or other bitmap generator. Objects that are not recognized by the recognizer are stored and displayed using a portion of the original bitmap so that an apparently perfect recognized document is displayed.

The apparatus of the present invention includes a system for producing a raster image derived from a hybrid data structure including coded and non-coded portions from an input bitmap. The system includes a data processing apparatus and a recognizer for performing recognition on an input bitmap to detect identifiable objects within the bitmap. The system creates a hybrid data structure including coded portions derived from the identifiable objects. The hybrid data structure also includes non-coded portions derived from portions of the bitmap which do not correspond to the identifiable objects (non-identifiable objects). Finally, an output device, such as a printer, a plotter, or a computer display, develops a visually perceptible raster image derived from the hybrid data structure. The raster image includes newly-rendered raster images of the identifiable objects and scaled raster images of the non-identifiable objects. An input device, such as an optical scanner, a digital camera, and a bitmap generator, can be included to provide the input bitmap to the data processing apparatus.

The system preferably performs geometric correction to the input bitmap, which includes creating a distortion map of the bitmap and creating a layout correction transform from the distortion map and the bitmap. The identifiable objects of the hybrid data structure preferably include codes for recognized lexical units such as characters and words comprising the characters. The non-identifiable objects preferably correspond to unrecognized words which fall below a recognition threshold confidence level. Non-coded data is added to the hybrid data structure for the non-identifiable objects. The recognizer compares each of the identifiable objects with the portion of the input bitmap corresponding to the identifiable object to make size adjustments to the identifiable object if appropriate. The system preferably measures font attributes of the lexical units and assigns a typeface to each of the lexical units.

The present invention further includes a method for producing a hybrid data structure from a bitmap of an image. The bitmap includes identifiable objects and non-identifiable objects. The method, implemented on a digital processor, inputs a signal including a bitmap of an image and partitions the bitmap into a hierarchical structure of lexical units. Labels are assigned to a label list for each lexical unit of a predetermined hierarchical level, where each label in the label list has an associated confidence level. If a label in the label list for a lexical unit has a confidence level greater than a threshold confidence level, then that lexical unit is considered identifiable and is stored in a hybrid data structure as coded data. If no label in the lexical unit's label list has a confidence level greater than the threshold confidence level, then the lexical unit is considered non-identifiable and is stored as non-coded data. A non-identifiable object is preferably stored as a bitmap together with a location at which to display the bitmap. The predetermined hierarchical levels preferably include a character hierarchical level and a word hierarchical level, and a lexicon is searched to determine if a label is a valid label.

In yet another aspect of the present invention, a system for producing and manipulating a hybrid data structure includes a recognizer operating in a data processing apparatus that detects identifiable objects within the input bitmap. An analyzer creates and stores a hybrid data structure in memory of the data processing apparatus, where the data structure includes coded data derived from the identifiable objects and non-coded data derived from bitmap portions which do not correspond to the identifiable objects. Non-identifiable objects associated with the non-coded data are also stored in the hybrid data structure. A display device develops and displays an image, derived from the hybrid data structure, on a display device such as a screen. A display manager implemented on the data processing apparatus manipulates the image on the screen. The display manager includes an editor which permits the hybrid data structure and, thus, the image to be edited. The editor displays the coded and non-coded data and can be used to change a non-identified object into an identified object. The display manager also preferably includes a finder which searches the hybrid data structure for a specified object by searching the hybrid data structure for a label in the label list of each lexical unit that approximately corresponds to a search word or phrase.

An advantage of the present invention is that unrecognized images within a body of recognized images are displayed as original bitmap portions instead of as misrecognized images or as error images. This allows a user to display a recognized image which appears to be virtually identical to the source image, yet store much of the information in a coded form.

Another advantage of this invention is that a hybrid data structure of codes for recognized images and bitmaps for unrecognized images is produced that can be searched, edited, manipulated, and displayed.

These and other advantages of the present invention will become apparent to those skilled in the art upon a reading of the following specification of the invention and a study of the several figures of the drawing.

BRIEF DESCRIPTION OF THE DRAWINGS

FIG. 3 is an example of a displayed image produced by the present invention;

FIG. 5b is an illustration showing the lexical units of the hierarchy of FIG. 5a;

FIG. 5c is a diagrammatic illustration showing lower levels of the hierarchy of FIG. 5a;

FIG. 7 is a flow diagram illustrating the step of FIG. 5 for assigning label lists and confidence levels to lexical units;

FIG. 7a is a table illustrating the character labels and confidence levels assigned to characters;

FIG. 7b illustrates a word label list;

FIG. 8 is a flow diagram illustrating the font attribute recognition step of FIG. 7;

DETAILED DESCRIPTION OF THE PREFERRED EMBODIMENT

The present invention is well suited for displaying pages of scanned text that include several different types of fonts, letter sizes, formatting variations, and hard-to-recognize characters. However, the present invention is also suited to other types of image display, such as graphical architectural diagrams, maps, technical illustrations, etc.

A number of terms are used herein to describe images and related structures. "Pixel" refers to a single picture element of an image. Taken collectively, the pixels form the image. "Bitmap" refers to bits stored in digital memory in a data structure that represents the pixels. As used herein, "bitmap" can refer to both a data structure for outputting black and white pixels, where each pixel either is on or off, as well as a "pixel map" having more information for each pixel, such as for color or gray scale pixels. "Resolution" refers to the size, shape, and separation of pixels of a displayed or printed image. For example, a displayed bitmap of very small pixels, closely spaced, has a greater resolution, i.e. greater detail, than a displayed bitmap having large pixels widely spaced. "Render" refers to the creation of a bitmap from an image description, such as a character outline. "Raster" refers to the arrangement of pixels on an output device that creates an image by displaying an array of pixels arranged in rows and columns. Raster output devices include laser printers, computer displays, video displays, LCD displays, etc. "Coded" data is represented by a "code" that is designed to be more concise and to be more readily manipulated in a computing device than raw data, in, for example, bitmap form. "Non-coded" data is data that is not represented by a code. For example, the lowercase letter "a" can be represented as coded data, e.g., the number 97 in ASCII encoding, or as non-coded graphical or image data that could be used to create the appearance of "a" on an output device such as a display screen or printer. Fonts usually have one or more associated "encodings" that associates coded data with non-coded data.

Figure 1:
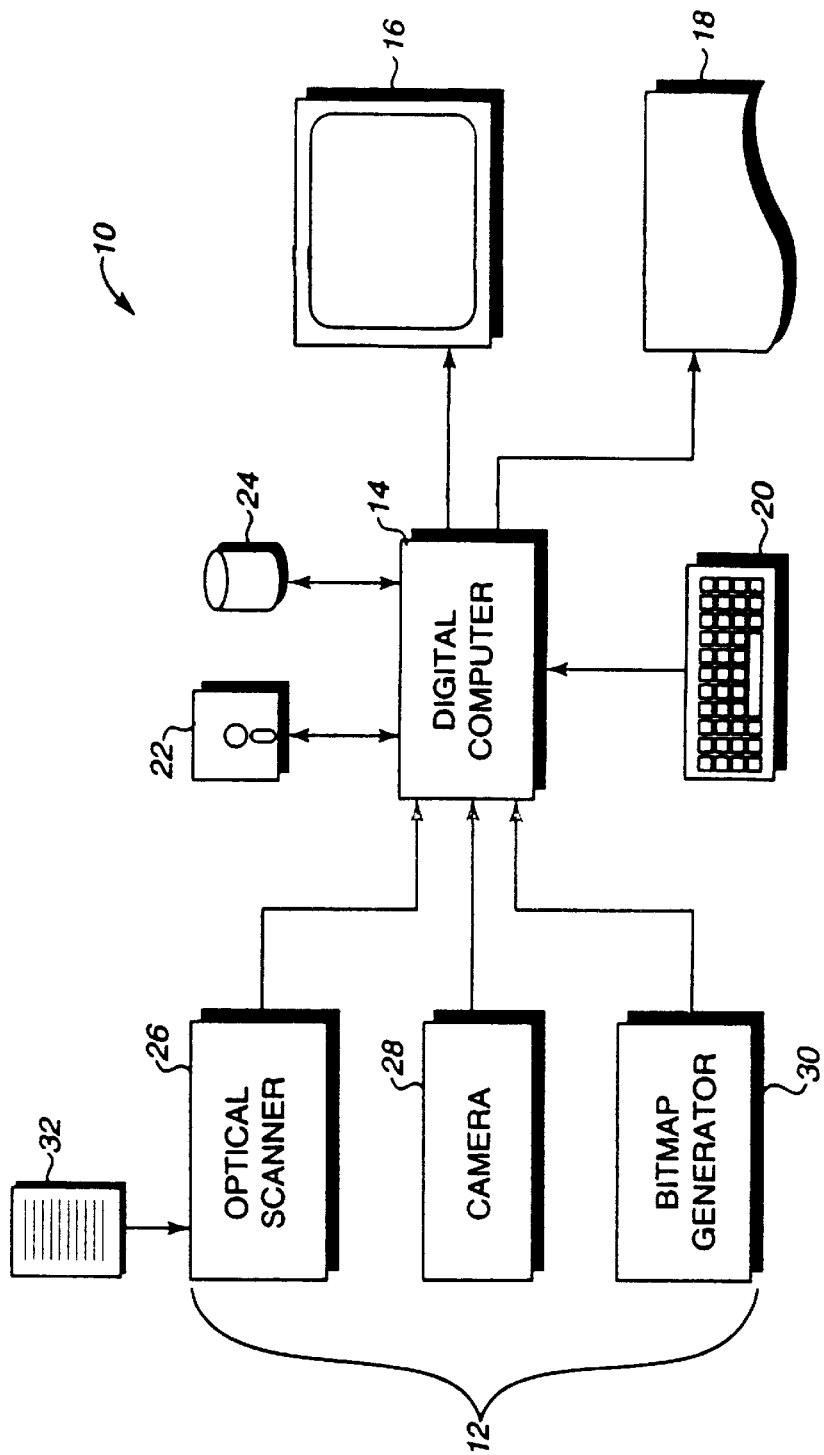
FIG. 1 is a block diagram of a computer system for creating a hybrid data structure and displaying an image in accordance with the present invention.

In FIG. 1, a computer system 10 for producing a hybrid raster image includes input devices 12, a digital computer 14, a display screen 16, a printer 18, a keyboard 20, a floppy disk drive 22 and a hard disk drive 24. Input devices 12 are used for inputting a bitmapped image to digital computer 14. In the described embodiment, input devices 12 include an optical scanner 26, a digital camera 28, and/or a bitmap generator 30. Optical scanner 26 is a device which scans an image and generates a bitmap from the scanned image. Such scanners are typically used to digitize images formed on sheets of paper, such as sheet 32, to a bitmap form that can be input into digital computer 14. The generated bitmap typically includes textual objects such as characters and words from the scanned sheet of paper. An optical scanner suitable for use with the present invention is the ScanJet IIcx manufactured by Hewlett-Packard Co. of Palo Alto, Calif. Digital camera 28 creates a bitmap of an image captured by the camera. For example, if a user takes a "snapshot" of a scene with camera 28, the camera digitizes the scene and outputs the digital data as a bitmap to digital computer 14. Digitizing cameras are well-known to those skilled in the art. Bitmap generator 30 can be any device which generates a bitmap and outputs that bitmap to digital computer 14. For example, a different computer system can provide a bitmap to digital computer 14 over network data lines or telephone lines using a modem (not shown), or a bitmap can be received by a facsimile (fax) card of the digital computer. Furthermore, a user can generate a bitmap on a computer and can transport the bitmap by floppy disk 22 or other storage medium to the system 10. The bitmaps generated by digital camera 28 and bitmap generator 30 can include text objects or other objects, similar to the bitmaps generated by optical scanner 26. These objects may be identifiable or not identifiable by recognizers used in the present invention (described below).

Digital computer 14 receives an input bitmap from one or more input devices 12 and can display, transform, and/or manipulate the input bitmap. In the described embodiment, computer 14 can also implement a recognizer to recognize text characters or other types of objects within the input bitmap. Once recognized, the characters or other identifiable objects can be stored as codes (coded data) in a standard format such as ASCII. The objects can then be displayed and manipulated by application programs which accept the format of the codes. A user can then view the formatted objects on display screen 16 and edit them, if desired. Digital computer 10 can be a personal computer (such as an IBM-PC AT-compatible personal computer), a workstation (such as a SUN or Hewlett-Packard workstation), etc.

To display images on an output device, the computer can implement one or more types of procedures. For example, computer 14 can transfer input bitmap data directly to display screen 16 or printer 18 (or provide the bitmap data in a memory cache) to display an image of the bitmap data. The computer can also transform a recognized object into an image description. For example, the code for a recognized text character can be associated with an image description which takes up less memory space than several copies of the bitmap of the recognized character. A well known image description language is the PostScript® language by Adobe Systems, Inc. of Mountain View, Calif. For example, the image description can reference stored character outlines which describe the shape of the character and includes other rendering information. A well-known character outline format is the Type 1® format, by Adobe Systems, Inc. Using character outlines, computer 14 can render a bitmap for each character and send the bitmap to a storage area that is accessible to an output device for display. In other embodiments, output devices such as printers can include microprocessors or similar controllers which can render a bitmap from character outlines.

Digital computer 14 can also be used to modify an input bitmap or an image description of an input bitmap. If a user wishes to change certain portions of the bitmap, digital computer 14 performs those changes and provides the changed image to one of the output devices.

Display screen 16 displays an image of the input bitmap and/or the images derived from the input bitmap (i.e. rendered images). In the described embodiment, display screen 16 is a raster device which displays images on a screen corresponding to bits of a bitmap in rows and columns of pixels. That is, a bitmap can be input to the display screen 16 and the bits of the bitmap can be displayed as pixels. The input bitmap can be directly displayed on the display screen, or computer 14 can first render image descriptions into bitmaps and send those bitmaps to be displayed on display screen 16. Raster display screens such as CRT's, LCD displays, etc. are suitable for the present invention.

Printer device 18 provides an image of the input bitmap and/or the images derived from the input bitmap on a sheet of paper or a similar surface. Printer 18 can be a laser printer, which, like display screen 16, is a raster device that displays pixels derived from bitmaps. Printer device 18 can print images derived from coded and non-coded data. Other devices can be used as printer device 18, such as a plotter, typesetter, etc.

Keyboard 20 is used by a user to input commands and other instructions to digital computer 14. Images displayed on display screen 16 or accessible to digital computer 14 can be edited, searched, or otherwise manipulated by the user by inputting instructions on keyboard 20.

Floppy disk drive 22 and hard disk drive 24 can be used to store input bitmaps, image descriptions, character outlines, and rendered bitmaps. Floppy disk drive 22 facilitates transporting such data to other computer systems 10, and hard disk drive 24 permits fast access to large amounts of stored data such as bitmaps, which tend to require large amounts of storage space.

Figure 2:
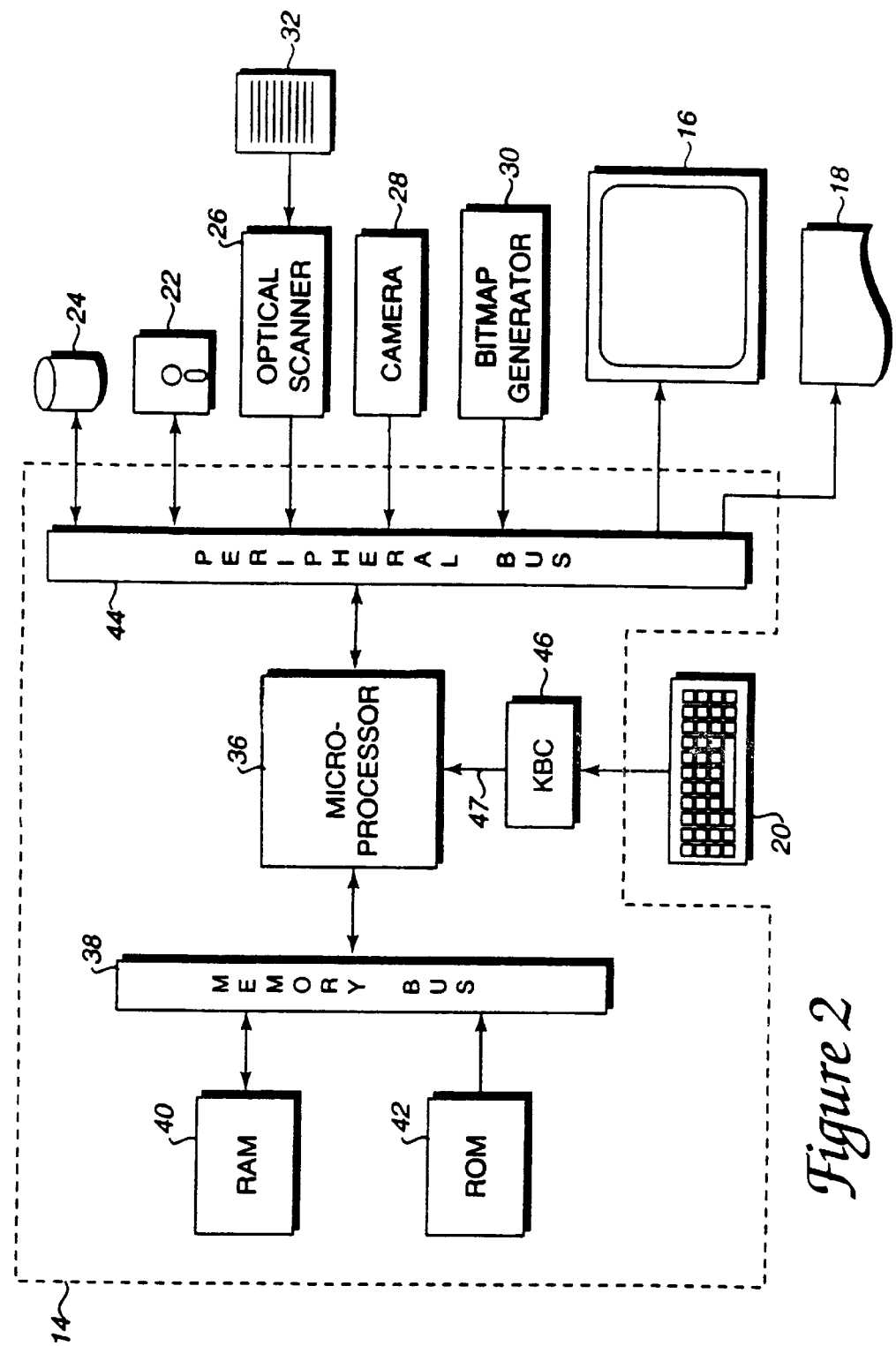
FIG. 2 is a block diagram of the digital computer of FIG. 1.

FIG. 2 is a block diagram of digital computer 14 and associated input and output devices as shown in FIG. 1. Digital computer 14 preferably includes a microprocessor 36, a memory bus 38, random access memory (RAM) 40, read only memory (ROM) 42, a peripheral bus 44, a keyboard controller 46.

Microprocessor 36 is a general purpose digital processor which controls the operation of digital computer 14. Using instructions retrieved from memory, microprocessor 36 controls the reception of the input bitmap data from input devices 12, the recognition and conversion of any input bitmaps to image descriptions, the rendering of any character outlines to output bitmaps for display, the transfer of output bitmaps and/or image descriptions to output devices such as display screen 16 and printer 18, and the control of those output devices. For example, in the described embodiment, microprocessor 36 receives input bitmaps from an input device 12. These input bitmaps can, for example, represent characters on a sheet of paper 32. The input bitmaps can be divided into portions and recognized as characters, at which point they can be stored and displayed as character codes or other lexical units (as "identifiable objects"), in formats such as ASCII or PostScript. According to the present invention, objects of the input bitmap which cannot be recognized (non-identifiable objects) can be stored with an associated non-coded bitmap in the same data structure in which codes for identifiable objects are stored. This process is described in greater detail with reference to FIG. 4.

Memory bus 38 is used by microprocessor 36 to access RAM 40 and ROM 42. RAM 40 is used by microprocessor 36 as a general storage area and as scratch-pad memory, and can also be used to store input bitmaps and rendered bitmaps. ROM 42 can be used to store instructions followed by microprocessor 36 as well as image descriptions and character outlines used to display images of bitmaps in a specific format. For example, portions of the input bitmap representing characters can be recognized and described as ASCII character codes or an image description. The characters' associated character outlines can be retrieved from ROM 42 when bitmaps of the characters are rendered to be displayed as rendered images by an output device. Alternatively, ROM 42 can be included in an output device, such as printer 18, instead of being included in computer 14.

Peripheral bus 44 is used to access the input, output, and storage devices used by digital computer 14. In the described embodiment, these devices include floppy disk drive 22, hard disk drive 24, optical scanner 26, camera 28, bitmap generator 30, display screen 16, and printer device 18. Keyboard controller 46 is used to receive input from keyboard 20 and send decoded symbols for each pressed key to microprocessor 36 over bus 47.

FIG. 3 is a diagrammatic illustration 50 showing an example of a displayed raster image of the present invention generated from a hybrid data structure. Characters 52 and words 54 are raster images rendered from character codes. These characters and words are identifiable coded objects that have been stored in a specific format, such as ASCII or PostScript, having an associated size and typeface which can be stored and manipulated more easily than the original input bitmap form. When printed on a sheet of paper on printer 18, as shown in FIG. 3, character outlines associated with each identifiable character are rendered into bitmaps which are displayed as coded raster images by printer 18.

Non-coded raster images 56 are different from characters 52 and words 54. Non-coded images 56 are derived from portions of the original input bitmap which were not recognized by a recognizer implemented on microprocessor 36. In the described embodiment, the "confidence" level of recognition for the objects of images 56 was not high enough to allow the objects to be classified as identifiable objects; thus, they are non-identifiable objects. Since non-coded images 56 are not recognized and derived from stored (e.g., ASCII) character codes and character outlines, they are derived from non-coded data. The images 56 are displayed on printer 18 as images derived directly from the input bitmap which was received by digital computer 14 from an input device 12. Non-coded images 56 are thus as accurate as the original input bitmap image and can be displayed without having been recognized. For example, lines 57 cannot be recognized as characters or words, since they are graphical images. The display of images from non-coded data of the original bitmap portion that describes these lines allows the lines to be portrayed accurately. Herein, "coded images" are derived, rendered and displayed from coded data, and "non-coded images" are derived and displayed using non-coded data.

Figure 4:
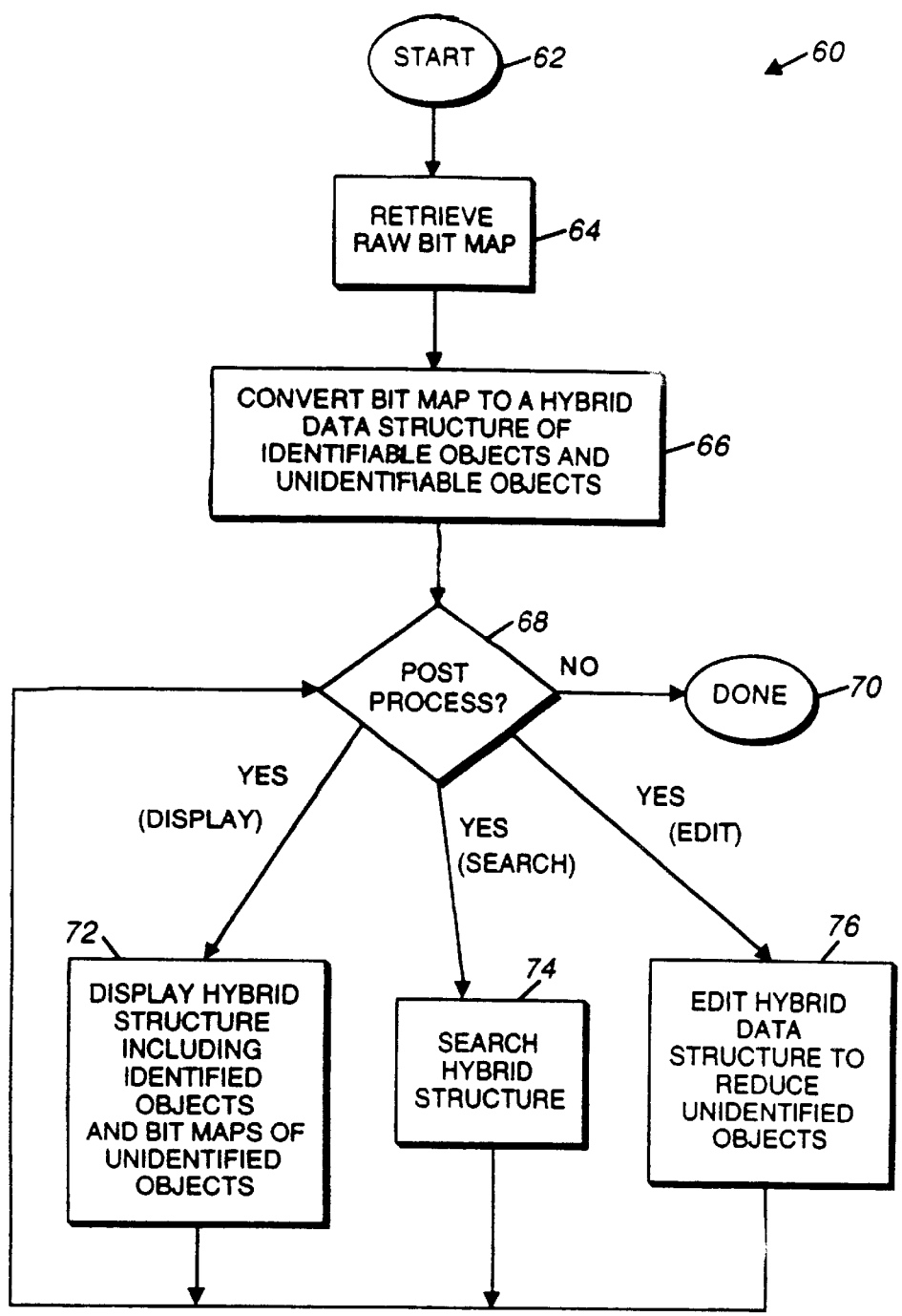
FIG. 4 is a flow diagram illustrating the method of providing a hybrid data structure and raster image of the present invention.

FIG. 4 is a flow diagram 60 illustrating the method of the present invention of producing a hybrid data structure and raster images derived from coded and non-coded data from an input bitmap. The essence of the process of the present invention is to produce and store the hybrid data structure, and the processes of displaying, editing, and searching the hybrid data structure can be included or provided from other implemented processes.

The process begins at step 62, and, in step 64, a raw input bitmap is retrieved from one or more input devices 12. As described above, the raw bitmap contains one or more objects, such as text characters and words or other shapes. In next step 66, the microprocessor 36 converts the raw bitmap into a hybrid data structure of identifiable objects and non-identifiable objects. The identifiable objects, such as words and characters, are derived from the portions of the bitmap which are able to be recognized by a recognizer implemented on the microprocessor as described below. Non-identifiable objects are objects derived from portions of the input bit map which are not able to be recognized by the recognizer. Non-identifiable objects are displayed as non-coded images derived from portions of the input raw bitmap. The process can optionally end after step 66 is complete; otherwise, the process continues to step 68.

In next step 68, the microprocessor determines if there is a post-process. A post-process occurs if the user wishes to display or manipulate the hybrid data structure created in step 66. The post-process may be performed much later and/or on another computer system (i.e., the hybrid data structure may be created on one computer and displayed or manipulated on different computer). If there is no post-process, then the process is complete as indicated in step 70, i.e., the process is completed with the creation of the hybrid data structure. If there is a post-process, the microprocessor determines if the user wishes to display the hybrid data structure, search the hybrid data structure, or edit the hybrid data structure.

If the user wishes to see a display, step 72 is implemented, in which a display manager implemented on the microprocessor controls the display of the hybrid data structure. The hybrid data structure is displayed, for example, on display screen 16 or on a sheet of paper by printer 18 and includes newly-rendered raster images from the codes of the identifiable objects and original non-coded raster images of the non-identifiable objects. A suitable display manager 72 is the Acrobat® software available from Adobe Systems, Inc. As shown in FIG. 3, the images of the non-identifiable objects are positioned on the display so that they are aligned with the displayed raster images of the identifiable objects and create a substantially uniform overall image. The process of displaying the hybrid data structure is described in greater detail with respect to FIG. 10. When the hybrid data structure has been displayed, the process returns to step 68.

If the user wishes to search the hybrid data structure, step 74 is implemented. In step 74, the microprocessor displays the hybrid data structure as detailed with respect to step 72 and allows a user to specify particular search criteria, such as a word or phrase. The microprocessor then searches the hybrid data structure for the specified criteria. The method of searching of the present invention is described in greater detail with respect to FIG. 11. When the user has finished searching, the process returns to step 68.

If the user wishes to edit the hybrid data structure, step 76 is implemented. The hybrid data structure is preferably displayed on a display screen as detailed in step 72. In addition, the display manager presents an editing interface for the user which provides a number of options, including character or word replacement and editing of misrecognized words and characters. The editing process is described in greater detail with respect to FIG. 12. When the user is finished editing, the process returns to step 68.

Figure 5:
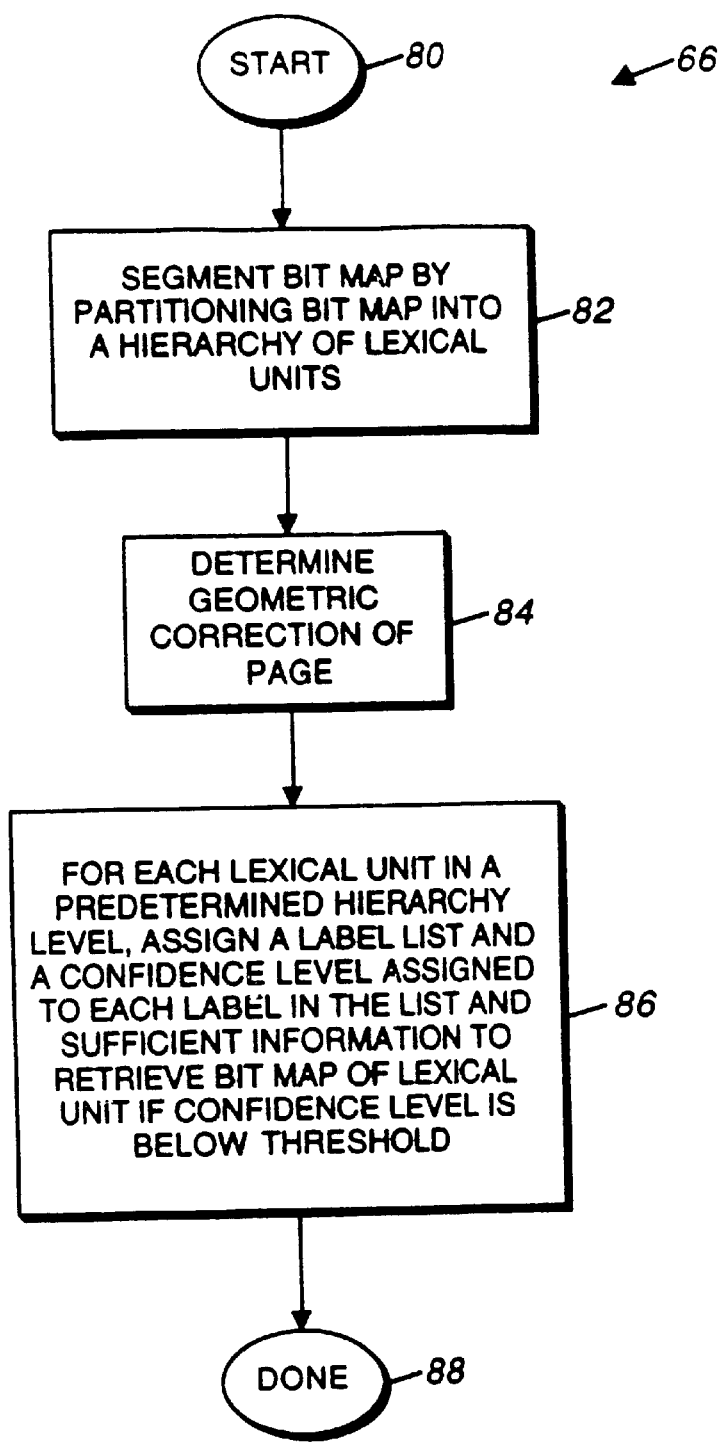
FIG. 5 is a flow diagram illustrating the step of converting a bitmap to a hybrid data structure of FIG. 4.

FIG. 5 is a flow diagram 66 illustrating the conversion of the raw input bitmap to a hybrid data structure as shown in FIG. 4. The process begins at 80. In step 82, the microprocessor segments the input bitmap by partitioning the bitmap into a hierarchy of lexical units. "Lexical units" refer to portions of an image or bitmap which correspond to such units as characters, words, text lines, text blocks, etc. The described process is directly applicable to an input bitmap which includes text words and characters, such as a bitmap produced by an optical scanner which has scanned a text page. However, the term "lexical units" can also refer to graphical objects, such as regular shapes, icons, symbols, lines, etc.

Figure 5A:
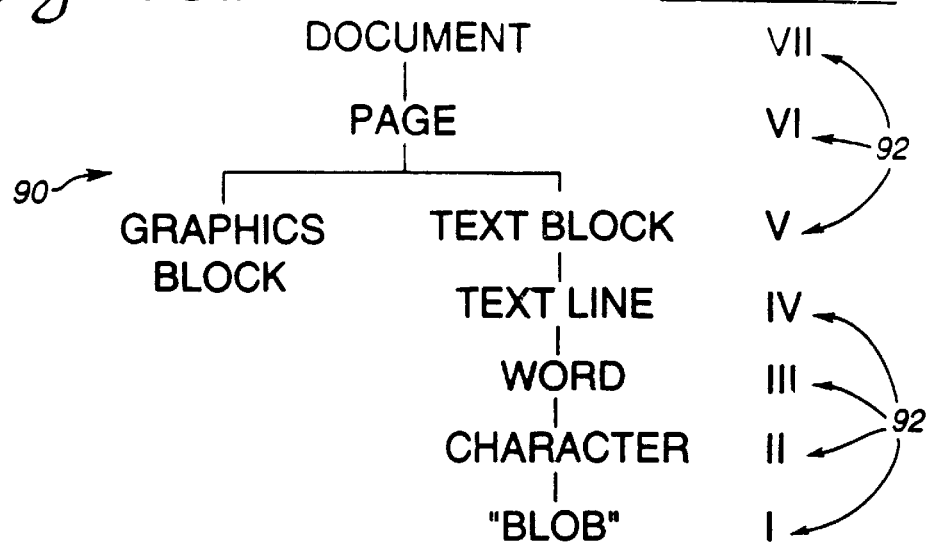
FIG. 5a is a table showing the hierarchy of lexical units used in the present invention.

FIG. 5a is a diagrammatic illustration 90 of the hierarchy used by the present embodiment to segment the input bitmap. The hierarchy is organized into seven levels 92 in the described embodiment, where the first level includes lexical units generally having the smallest area, and the seventh level includes lexical units generally having the largest area. As shown in FIG. 5a, the levels of the hierarchy, from first to seventh, are a "blob", a character, a word, a text line, a text (or graphics) block, a page, and a document A "blob" refers to a contiguous mark (originating as ink or other displayed image constituent, such as toner, light pixels, etc.) which is a part of a single character, such as the dot of an "i" character. A graphics block can be any portion of graphical images on a page that form a distinct unit from other graphical portions on the page. For example, an icon or shape surrounded by blank space may be considered a graphics block.

Figure 5B:
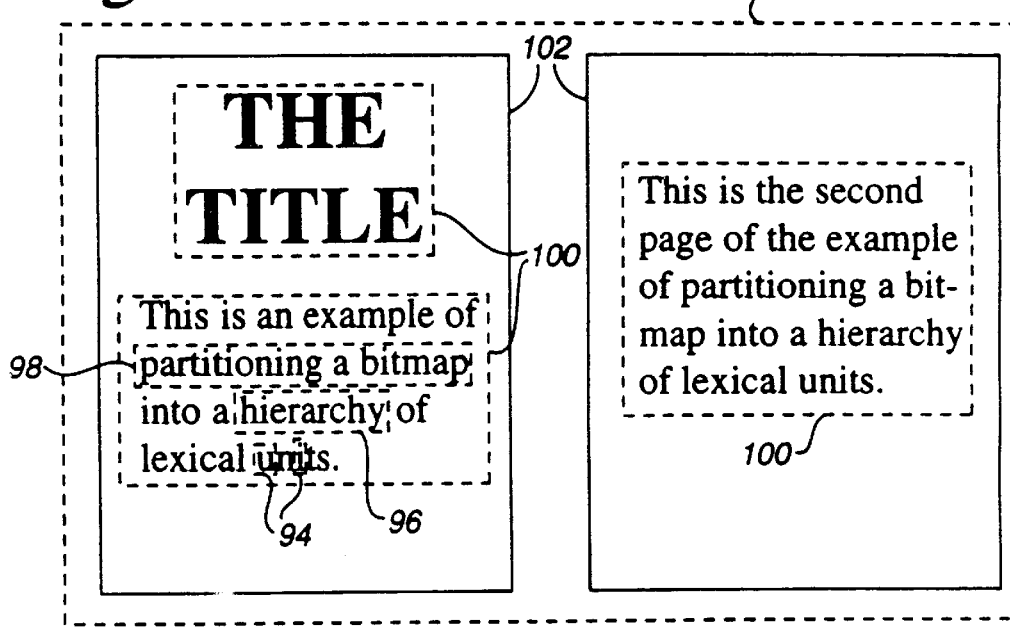

FIG. 5b is an illustration of the lexical units of the hierarchy of FIG. 5a. Characters 94 are level II in the described hierarchy. A word 96 is level III, and a text line 98 is level IV. Text blocks 100 are level V, and page 102 is level VI. Finally, document 104, which includes two pages in the shown example, is level VII.

Figure 5C:
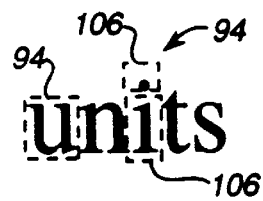

FIG. 5c is a diagrammatic illustration showing the "blob" and character levels of the hierarchy of FIG. 5. A character 94 can include one or more "blobs" 106. For example, the character "u" includes only one blob, which is the entire character. The character "i", however, includes two blobs 106; the dot of the "i" and the lower portion of the "i."

Referring back to FIG. 5, each lexical unit of each level of the hierarchy shown in FIG. 5a is segmented and identified by the microprocessor. Preferably, the coordinates of the segmented lexical units and the bounding boxes of the lexical units (explained with reference to FIG. 9) are stored at this time. Once the bitmap has been partitioned into a hierarchy of lexical units in step 82, step 84 is preferably implemented, in which the geometric correction of each page of the input bitmap is determined. In this step, a correcting transform is created for any lexical units of the input bitmap which are misoriented with reference to a bitmap coordinate reference system. Step 84 is described in greater detail with reference to FIG. 6.

In next step 86, a label list having one or more labels is assigned by a recognizer to each lexical unit which has been organized in one or more predetermined hierarchy levels. A confidence level is assigned to each label in the list which provides an indication of how "confident" the recognizer is that the label correctly represents the lexical unit. Sufficient information is also assigned for each lexical unit in predetermined hierarchy levels to retrieve the original bitmap portion of the lexical unit if the confidence levels for that lexical unit are below a recognition threshold. These processes are described in greater detail with reference to FIG. 7. The lexical units having one or more labels with a confidence greater than the threshold level are therefore "identifiable objects," and the lexical units having no labels with a confidence level greater than the threshold value are "non-identifiable objects." Both identifiable objects and non-identifiable objects are placed in a hybrid data structure in step 86. After step 86 has been accomplished, the process is complete as indicated at 88.

Figure 6:
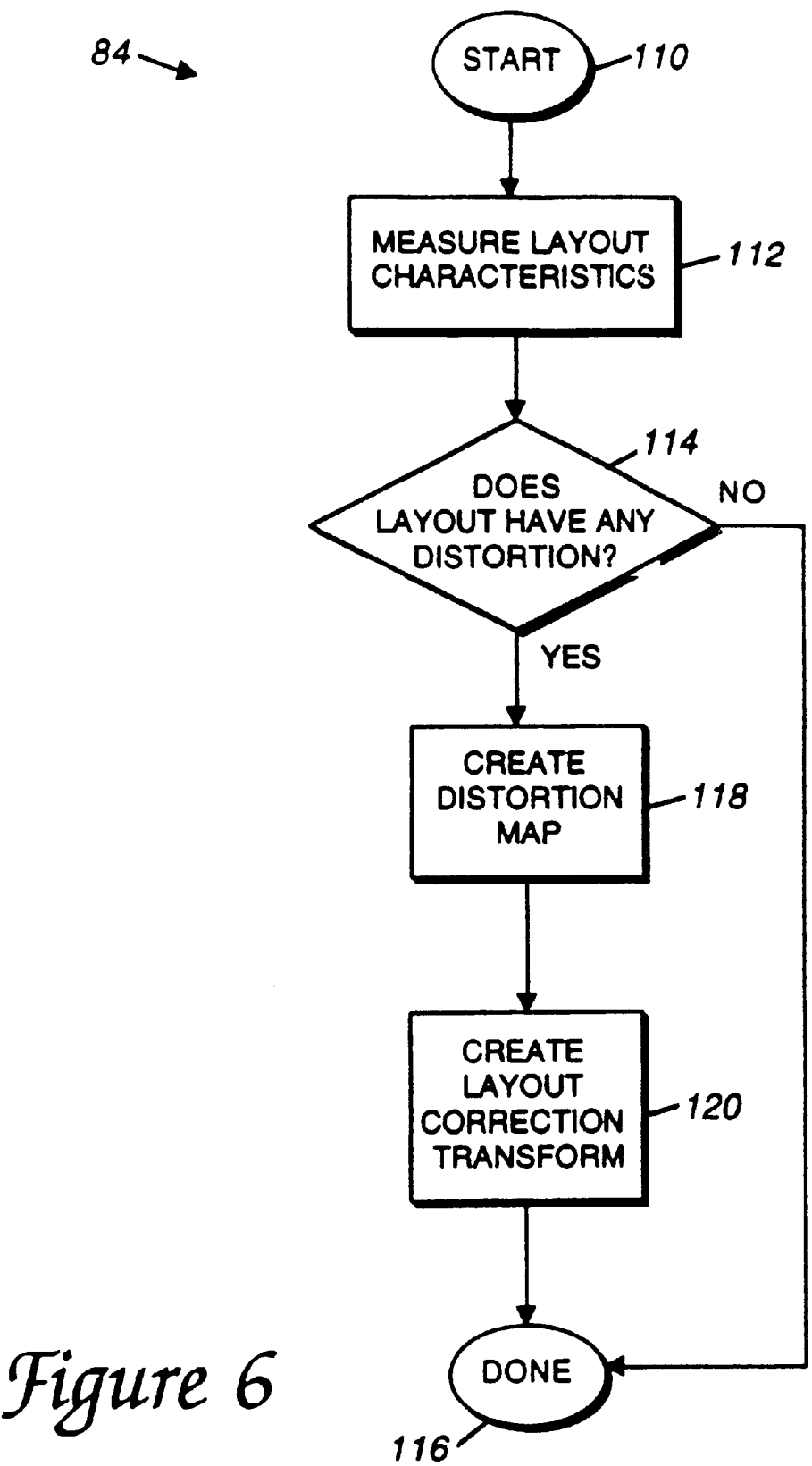
FIG. 6 is a flow diagram illustrating the geometric correction step of FIG. 5.

FIG. 6 is a flow diagram illustrating the step 84 of determining the geometric correction of the page as shown in FIG. 5. The process 84 begins at 110, and in step 112, the layout characteristics of the page are measured. In this step, only general measurements are taken to see if correction is required. For example, the rotation of the input bitmap with reference to an output bitmap coordinate system can be measured. The output bitmap coordinate system can represent the reference orientation for output bitmaps which are sent to an output device such as printer 18. The angle of the text lines with respect to the angle of the bitmap coordinate lines can be measured. Also, the curvature of text lines can be measured with respect to the bitmap coordinate system. The distance between a text line and a coordinate grid line can be measured along the length of the text line to see if the distance varies. Both the rotation of the entire bitmap and the curvature of the text lines are checked in this step because they are common alignment problems which occur when a page of text or other images is scanned by an optical scanner 26.

In step 114, the microprocessor determines if the bitmap layout has any distortion. The measurements taken in step 112 are examined and compared to threshold values to detect general distortion. For example, the rotation of the bitmap can be detected by comparing the angle measurements of the text baselines with respect to the bitmap coordinate system.

If the angles are under a threshold value, for example one degree, then no distortion is present. The curvature of text lines can be detected by examining the distance between each text line and a bitmap coordinate system grid line. If the distance does not vary outside of a threshold range, for example 1/16 inch, then no distortion is present. If the input bitmap is determined to have no distortion, then the process is complete as indicated at 116.

If the input bitmap is determined to have distortion, then step 118 is executed, in which a distortion map is created from the bitmap. A distortion map is created by measuring the deviation of rectilinear objects with respect to the bitmap coordinates. Rectilinear objects include such objects as text baselines (i.e., a line with which the bottom ends of non-descending characters in a line of text are aligned) and near-horizontal or near-vertical graphic lines. The distortion map is represented by a list of x and y displacements at selected rectilinear object coordinates (e.g., the endpoints of lines).

In step 120, a layout correction transform is created. This transform specifies how the microprocessor is to adjust the bitmap so that the measured distortion is reduced or eliminated. The correcting transform can be represented as a polynomial approximation of the distortion map. Methods for computing correction transforms are well known to those skilled in the art. For example, Chapter 14 of *Numerical Recipes in C—The Art of Scientific Computing*, Press, William et al., Cambridge University Press, 1988, describes one such method known as Least Squares Approximation. The correction transform is used before displaying an output bitmap as an image as detailed with respect to FIG. 10. The process is then complete at 116.

FIG. 7 is a flow diagram illustrating the step 86 of assigning a label list to each lexical unit in predetermined hierarchy levels and assigning sufficient information to retrieve the original bitmap portion of the lexical unit if the confidence levels for that lexical unit are below a threshold. A "label list," as described herein, includes one or more labels and a confidence level for each label. Thus, if only one label is produced by a recognizer, the label can still be considered to be in a "list." In the described embodiment of FIG. 7, the predetermined hierarchy levels which are assigned label lists are the "character" hierarchy level (level II in FIG. 5a) and the "word" hierarchy level (level III in FIG. 5a). The described embodiment is thus most applicable to an input bitmap which describes a page of text. In alternate embodiments, different hierarchy levels can be used. Also, a different number of hierarchy levels can be used; for example, only one level, characters, can be recognized. However, when recognizing characters, another hierarchy level including connected characters can also be recognized to decipher ambiguous character image combinations, such as two overlapping characters.

The process begins at 124. In step 126, the character counter variable "C" is initialized to 1 and C is compared to NCHAR, which is the number of characters which have been segmented in the input bitmap in step 82 of FIG. 5. If "C" is less than NCHAR, step 128 is implemented, in which recognition is performed on CHAR(C) to produce a component character list (label list) having a confidence level for each component character in the list. At this step, all the segmented characters in the raw bitmap are assigned a component character list with confidence levels.

The recognition of characters from the segmented bitmap is preferably performed by recognition software implemented by microprocessor 36 (or another connected microprocessor) which can analyze a bitmap of one of many different resolutions. Such recognizers are well known to those skilled in the art. A suitable recognizer for use with the present invention is Recore™, sold by Ocron, Inc. of Santa Clara, Calif. A recognizer typically outputs a number of different possibilities which each could represent the bitmap character. The recognizer assigns a confidence level to each of these possibilities (or "labels") which represents how close the recognizer believes the label is to the identity of the character. In the described embodiment, a character label is actually a "shape code". A shape code is not the actual identity of a character, but represents the general shape of the character. For example, the shape code "O" can represent a capital "O", a lowercase "o", or a zero ("0"). The recognizer recognizes the segmented bitmap character as one or more shape code labels, each of which has an associated confidence level. The confidence levels of the described embodiment are separate numeric values; however, the confidence levels can be implemented as other indicators. For example, if only one label is produced by the recognizer, the confidence level can be the label itself, or, if no label is produced, the confidence level can be a null symbol.

FIG. 7a is a table 146 which shows examples of shape codes and associated confidence levels for a recognized bitmap character. For example, the bitmapped character "O" was segmented and sent to the recognizer as CHAR(C) in step 128 of FIG. 7. The recognizer analyzes the bitmapped character and outputs a label list such as the one shown in FIG. 7a. The shape codes are character labels 148 which represent the shape of the recognized character. For each shape code a confidence level 150 is associated which indicates how close the bitmapped character is to that label in the recognizer's analysis. In the example of FIG. 7a, the character label "O" has the greatest confidence level at 95%. Character labels "C" and "Q" have much lower confidence levels. The implied characters 152 are the possible characters represented by character labels 148. Character label "C" can represent two possible characters, "C" and "c." Character label "Q" represents only one possible character, "Q."

Referring back to FIG. 7, steps 126 and 128 are implemented for each segmented character until all characters in the raw bitmap have been analyzed by the recognizer. The process then continues to step 130, in which a word counter variable "W" is set to one and W is compared to NWORDS, which is the number of words which have been segmented in the raw bitmap in step 82 of FIG. 5. If "W" is less than NWORDS, step 132 is implemented, in which a word recognizer performs recognition on WORD(W) (i.e. a segmented word bitmap) using the component character list and other procedures to produce a word list (label list) having a confidence level for each label. All of the segmented words of the input bitmap are assigned a label list with confidence levels regardless of the values of the confidence levels.

Word recognition typically involves generating possible character sequences (i.e., word labels) determined by the component character labels and assigning a confidence level to each such sequence. One way of determining word label confidence levels is by a three-step process. First, the confidence level of component characters are adjusted according to the character's conformance with local page geometry. Local page geometry includes, for example, the character's position relative to a baseline, an x-height line based on the, top end of mid-height characters of the surrounding text, and a cap-height line based on the top end of higher characters of the surrounding text. Second, the adjusted confidence levels of the component characters are combined (e.g., via multiplication if confidence levels are given as probabilities) to yield a preliminary word label confidence level. Finally, the preliminary word label confidence level is adjusted according to the degree to which the word label conforms with various predefined lexical constructs. Predefined lexical constructs include lexicons (word lists), common character patterns (e.g., phone numbers or dates), and character subs-equence probabilities (e.g., bigrams, trigrams, and n-grams, i.e., combinations of 2, 3, or n characters). Word recognizers which can produce word labels and word label confidence levels by this and other methods are well-known to those skilled in the art. For example, the abovementioned recognizer Recore sold by Ocron, Inc., is suitable for both the character and word recognition of the present invention.

FIG. 7b shows an example of a word label list 170 including word labels 166 and associated confidence levels 168 for the word bitmap "Open." The complete list (not shown) includes a word label entry for each combination of characters implied by the shape code labels of the four component characters ("O," "p," "e," and "n"). FIG. 7a shows three recognized character labels and implied characters for the first character ("O") for a total of six possible characters (including all implied characters). If there were six possible characters for each of the four characters in the word "Open," there would be $6^4$ or 1296 character sequences in the label list 170. The seventh entry in list 170 ("Open") has the highest confidence level of the labels shown.

Referring to FIG. 7, in next step 134, a number of label entries for WORD(W) and their associated confidence levels are saved in a hybrid data structure. In the described embodiment, all the word labels having a confidence level above a predetermined storage threshold are stored in the hybrid data structure. Thus, in the example of FIG. 7b, if the storage threshold level were 50 or greater, then four labels from the shown label list 170 would be stored in the hybrid data structure. In other embodiments, different amounts of word labels for WORD(W) can be stored in the hybrid data structure. For example, if the hybrid data structure were being stored in a format which only allowed one label to be stored (described with reference to FIG. 11), then the word label having the greatest confidence level would be saved in the hybrid data structure. Depending on the highest confidence level of the stored labels and the recognition threshold, some words in the hybrid data structure are considered identifiable objects, and some are considered non-identifiable objects. The hybrid data structure can be stored in memory, saved as a file on disk, etc. The word labels are preferably stored as coded data in a standard format such as ASCII, PostScript, etc.

In step 136, the coordinates of WORD(W) are saved with reference to the layout of the page. These coordinates can be saved in the hybrid data structure with the associated label entries. The microprocessor can use the coordinates to display a word's non-coded bitmap at its correct location on a page if required (see below). In step 138, the microprocessor saves the non-coded bitmap of WORD(W) if the confidence level of the top word label entry for WORD(W) is less than the recognition threshold confidence level. The "top" word label entry is the label having the greatest confidence level in the label list. Thus, in the example of FIG. 7b, the label "Open" would be the top label entry. In the described embodiment, the recognition threshold confidence level is user-selectable, and the default threshold value is 90. The confidence level of the top word label "Open" is greater than this recognition threshold, so WORD(W) is considered to have been recognized as the word "Open" and is an identifiable object. The input word bitmaps of identifiable objects are not saved. Alternatively, the identifiable object input bitmaps can be saved for a later process; in the preferred embodiment, the original raw bitmap and portions thereof are available, for example, for editing purposes (e.g., the entire raw bitmap is stored in memory or on a storage device). If the top label's confidence level were below the threshold value, then WORD(W) would be considered "unrecognized" (a non-identifiable object), and the non-coded word bitmap of WORD(W) would be saved in step 138. This non-coded data (bitmap) can be saved directly in the hybrid data structure of identifiable and non-identifiable objects. Alternatively, the non-coded data can be stored in a separate file or other storage area, and the storage location of the non-coded data can be stored in the hybrid data structure. This allows non-coded data to be easily accessed whenever the hybrid data structure is displayed or manipulated.

Once step 138 is implemented, the process returns to step 130 to process another segmented WORD(W). When all the segmented words of the input raw bitmap have been recognized or saved as bitmaps in step 130–138, the process preferably implements step 140, in which the font attributes of the entire raw bitmap are recognized. Each recognized (identified) word is assigned a typeface which determines how the characters of the recognized word appear when displayed. This step is described in greater detail with reference to FIG. 8.

Step 141 is implemented to compute size adjusting transforms for the identified words after font attributes have been assigned to each identified word. In step 141, each identified word is rendered in memory using the appropriate typeface and size assigned in step 140. The size of the rendered word is compared to the size of the original bitmap of the word. If the size difference is not within a predetermined tolerance, a scale adjustment is computed and stored with the identified word in the hybrid data structure. This process is described in greater detail with reference to FIG. 9. The process is then complete as indicated at 142.

FIG. 8 is a flow diagram illustrating step 140 of FIG. 7, wherein font attributes of the raw input bit map are recognized. The process begins at 210, and, in step 212, a page counter variable "P" is initialized to one and P is compared to NPAGES, which is the total number of pages in the raw bit map (known from the segmentation step 82 of FIG. 5). If P is less than or equal to NPAGES, then step 214 is implemented, in which a character counter variable "C" is set to 1 and C is compared to TOTCHAR, the total number of recognized characters on the currently-examined page of the raw bit map. "Recognized" characters are those character labels having a confidence level above a character recognition threshold. The character recognition threshold is preferably set at a high level, since only accurately-recognized characters should be used for font recognition. (If not enough characters have a confidence level above the threshold, the threshold can be lowered until enough characters qualify.) If $C \leq$ TOTCHAR, then step 216 is implemented, in which the microprocessor checks if CHAR (C), a recognized character label, is the selected character type. The selected character type is a certain character, such as "a," "g," etc., which is to be measured for font features. The order of characters which are selected can be determined from a predetermined, ordered list of characters. The ordered list can be designed so that characters which are easily measured for font features are positioned at the top of the list. If enough characters having the same font are measured, then the font can be determined and characters near the bottom of the ordered list do not have to be measured. If CHAR(C) is not the selected character type, then the process increments C in step 214 and a new character label is checked if it is the selected type in step 216. If CHAR(C) is the selected type, then step 218 is implemented. In step 218, a number of font features are measured for the portion of the raw bitmap corresponding to CHAR(C).

Figure 8A:
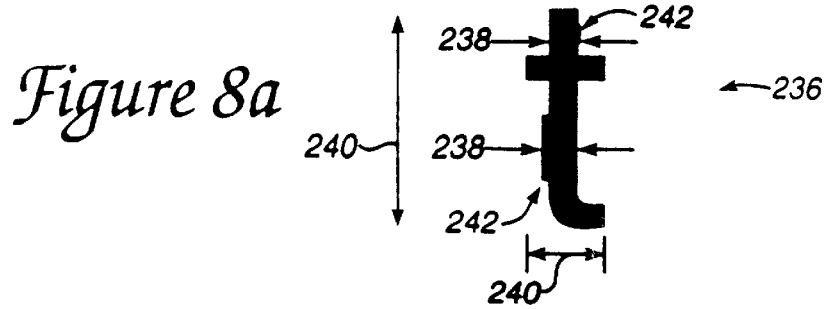
FIG. 8a illustrates the font feature measurements taken on an identified character.

FIG. 8*a* is a diagrammatic illustration showing a character 236 of the raw input bit map Font related features such as stem width 238 can be measured in various places to determine which font type the character belongs to. Other characteristics can also be measured, such as character height and width 240, x-height, optical density, italic angle, serif type, etc. Some of the measurements can be specific to the type of character. For example, a "t" may need measurements of certain stem areas, while an "a" character may need different measurements along the enclosed portion of the character. Often, irregularities 242 are present due to scanning errors or other errors propagated in the process of creating an input bit map. However, if several characters of the same type are measured, these irregularities are averaged out.

Figure 8B:
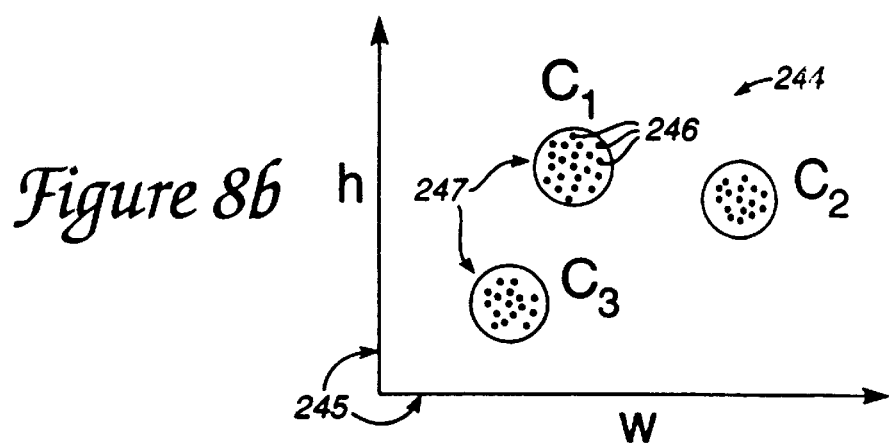
FIG. 8b illustrates the partitioning of different types of characters according to measured font attributes.

Referring back to FIG. 8, after step 218, the microprocessor returns to step 214 to increment C and measure the font features for the next character in the raw bit map. Once all the bitmap portions corresponding to recognized characters have been measured, the process continues to step 220, in which the characters on page P are partitioned into font "clusters." FIG. 8*b* shows a graph 244 of groups or clusters of font attributes which have been measured for one type of character (for example, a "t"). Axes 245 are "feature axes" in that they represent common features (dimensions, thicknesses, etc.) that are measured for all characters of a character type. For example, the two-dimensional graph 244 shows one axis representing the height dimension of the character and the other axis representing the width dimension of the character. These are only two of many possible features that can be measured and compared; other features (stem width, italic angle, etc.) can also be compared. Data points 246 represent characters having specific measurements on graph 244. Characters which have similar measurements are grouped in clusters 247. For example, cluster C1 designates a number of measured "t" characters which are very close to each other in height and width (and other features not shown). Therefore, they most likely have the same font type and are clustered together. Likewise, cluster C2 represents "t" characters that have similar measurements, but different measurements from cluster C1, which are grouped to represent a single font type.

Referring back to FIG. 8, once the clusters have been organized in step 220, step 226 is implemented, in which characters on the current page are examined for new font types which have not been found previously. Herein, a "font type" refers to a particular typeface (presently unassigned) to which a word belongs, and a font type number references a particular font type New font types are found by measuring characters as described above in steps 214–220 and comparing the measurements to the measurements taken for font types already found. If the new measurements are equivalent to measurements already taken, then the font type is not new, and the process continues to step 230. If the new measurements are different from measurements already taken, then a new font type has been found, and the process continues to step 228. In step 228, a font type number is created for each cluster of measurements organized in step 220 or in step 226. The process then continues to step 230.

In step 230, a font type is assigned to each recognized word label on the page. In alternate embodiments, font types can be assigned to character labels. Each font type corresponds to a font type number derived from the measurements of the characters. A font type is assigned to a word label by examining the characters of the word and determining which cluster includes one or more of those characters. Only the high-confidence (recognized) characters of the word are examined. Thus, in the example of FIG. 7*b*, the recognized word "Open" is assigned a font type number by examining one or more of the recognized characters of the word, such as "O," and determining in which cluster that character is included. The font type number for that cluster is then assigned to the word. If no high-confidence characters are present in a word, then the font type of an adjacent word can be assigned to the word.

In step 232, each font type number created is assigned to a typeface from a library of typefaces. In the described embodiment, several typefaces are stored in memory or on disk. These typefaces are standard typefaces, for example, Times®, Helvetica®, and other typefaces available from Adobe Systems, Inc. Each font type number is assigned a typeface by comparing the measurements of the font type (the cluster) with known measurements and characteristics which describe the standard typefaces. A font type number is assigned a standard typeface having the closest measurements to the averaged measurements of the font type. A typeface is assigned to each font type number. In a similar fashion until all the recognized words on the present page of the hybrid data structure can be associated with a standard available typeface. The process then returns to step 212, where the page variable "P" is incremented and fonts are similarly measured and assigned on the following page. When all the pages have been examined, the process is complete as indicated in step 234.

When storing the typeface and other font attributes for each identified word, different methods can be used. If the identified word is stored as ASCII character codes in the hybrid data structure, then a typeface and font description can be stored as a "font tag" with the ASCII characters. Storing character codes with a font tag is well known to those skilled in the art. If the identified word is stored in a more font-oriented coded language such as PostScript, the typeface and other font attributes for the word can be specified and stored within the rules of the language, as is well-known to those skilled in the art.

Figure 9:
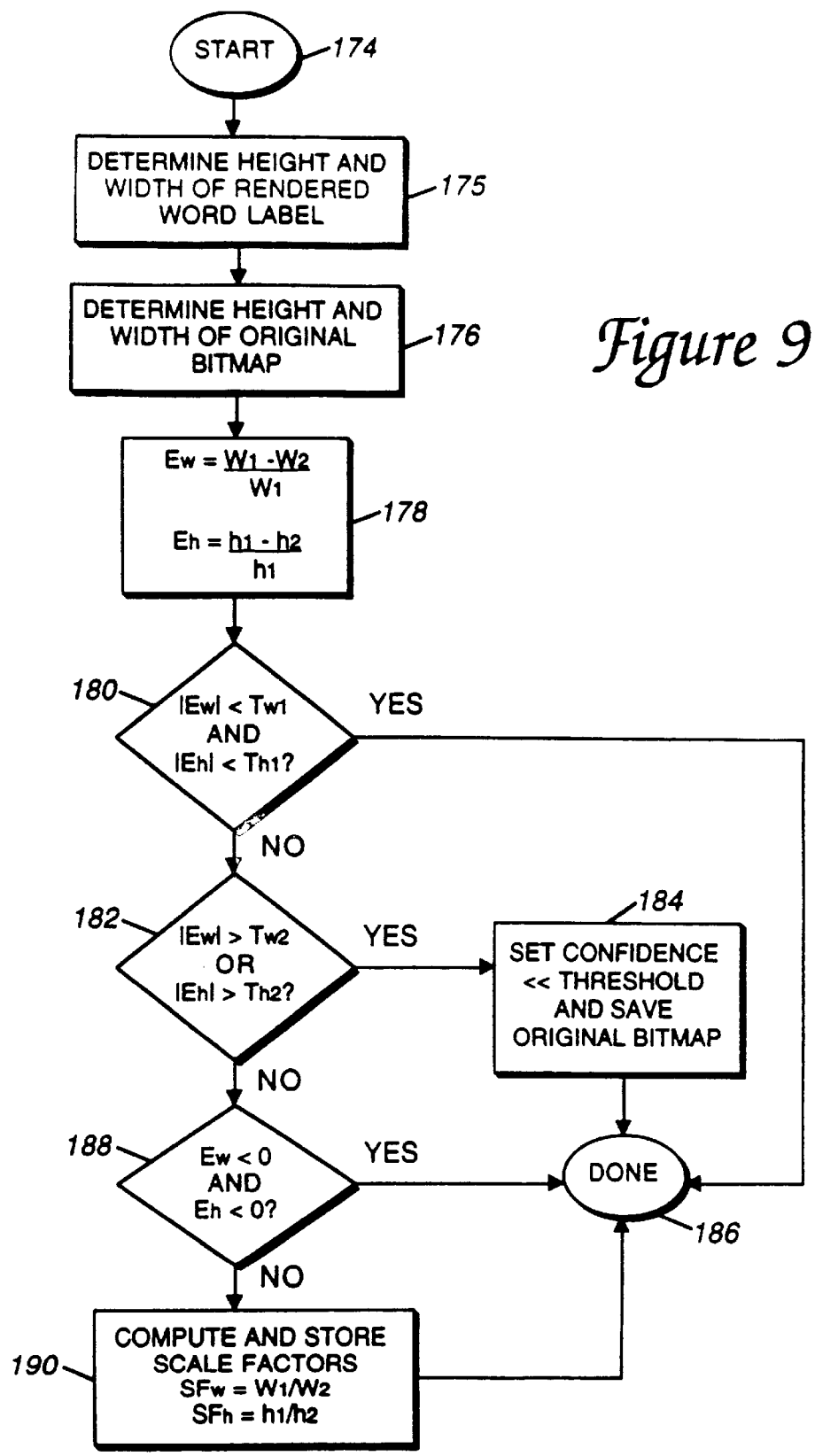
FIG. 9 is a flow diagram illustrating the step of FIG. 7 for computing a size adjustment of identified words.

FIG. 9 is a flow diagram illustrating step 141 of FIG. 7, in which size adjusting transforms are computed for identified words. The process begins at 174, In step 175, the height ($h_1$) and width ($w_1$) of the bounding box of the original, non-coded bitmap for the word are determined. A bitmap's bounding box is the smallest rectangle (aligned with the baseline) that completely surrounds the bitmap. The coordinates of the bounding boxes for all the segmented lexical units are available from the storage area where they were stored when originally the input bit map was originally segmented (step 82 of FIG. 5). In step 176, the word's top confidence label is used to render a bitmap in memory in the word's assigned typeface and size; then the height ($h_2$) and width ($w_2$) of the rendered bitmap's bounding box are determined.

Figure 9A:
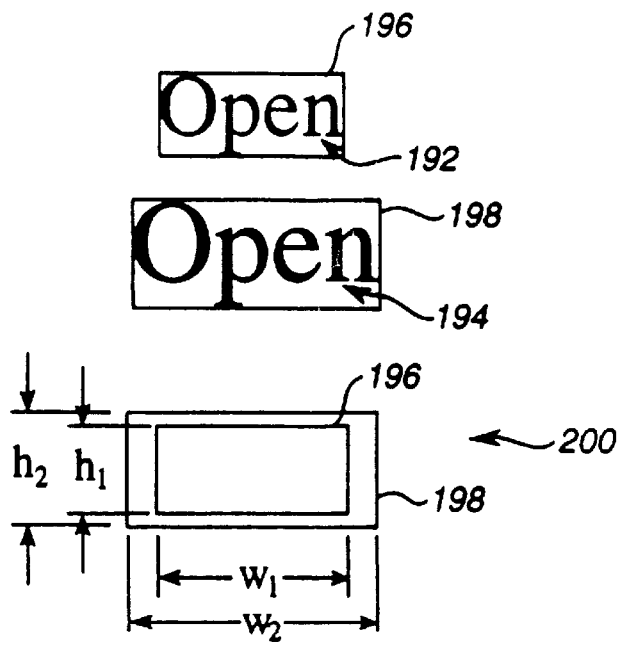
FIG. 9a illustrates the dimensions of a bounding box for a coded word and a bitmap bounding box derived from non-coded bitmap data.

FIG. 9*a* is a diagrammatic illustration showing the original, non-coded word bitmap 192 and the rendered bitmap 194 derived from the top label in label list 170. The bounding box 196 of the original bitmap and the bounding box 198 of the rendered bitmap are also shown. These bounding boxes are compared as shown in diagram 200, where the height $h_1$ and width $w_1$ are the dimensions for the bounding box of the original bitmap, and the height $h_2$ and width $w_2$ are the dimensions for the bounding box of the rendered bitmap.

Referring back to FIG. 9, in step 178, the relative error between the width $w_1$ of the bounding box of the original bitmap and the width $w_2$ of the bounding box of the rendered bitmap is calculated as "$E_w$." Similarly, the relative error between the heights $h_1$ and $h_2$ of the bounding boxes of the original and rendered bitmaps is calculated as "$E_h$."

Figure 9B:
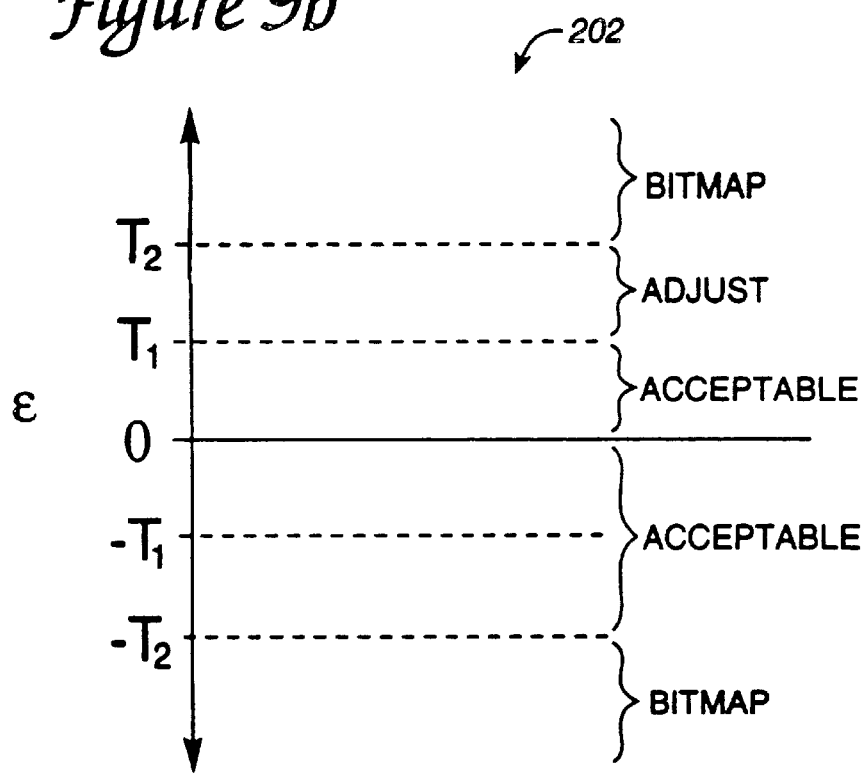
FIG. 9b illustrates the thresholds used in determining if a identified word should be adjusted.

Steps 180 and 182 check if the dimensions of the rendered bitmap's bounding box fall within an acceptable range. If the relative errors are too great the original bitmap 192 of the word is used. These steps are summarized in graph 202 of FIG. 9b. If the absolute value of $E_w$ is less than a first threshold value for the width ($T_{w1}$), and if the absolute value of $E_h$ is less than a first threshold value for the height ($T_{h1}$), then the relative error is adequately small and no further processing is required ($T_{w1}$ and $T_{h1}$ are shown as $T_1$ and Ew and Eh are shown as E in FIG. 9b). In the described embodiment, the value used for $T_{w1}$ and $T_{h1}$ are 0.05 and 0.05, respectively. The process is then complete as indicated in step 186. If either or both of $|E_h|$ and $|E_w|$ are greater than their corresponding $T_1$ values in step 180, then the process continues to step 182. In step 182, if the absolute value of $E_w$ is greater than a second threshold value for the width ($T_{w2}$), or if the absolute value of $E_h$ is greater than a second threshold value for the height ($T_{h2}$), then the dimensions of the rendered bitmap are considered to be too different from the original bitmap to be adjusted, and the process continues to step 184 ($T_{w2}$ and $T_{h2}$ are shown as $T_2$ in FIG. 9b). In the described embodiment, the value used for $T_{w2}$ and $T_{h2}$ are 0.20 and 0.20, respectively. In step 184, the confidence level for the topmost label of WORD(W) is set to a level less than the threshold confidence level and the non-coded bitmap of WORD(W) is saved in the hybrid data structure. Thus, WORD(W) becomes a non-identifiable object instead of an identifiable object, i.e., the non-coded bitmap for WORD (W) should be displayed instead of displaying the top label in the associated label list, since WORD(W) is outside the acceptable range of sizes. The process is then complete as indicated at 186.

If both of $|E_h|$ and $|E_w|$ are less than their corresponding $T_2$ values in step 182, then the process continues to step 188. In step 188, if $E_w$ and $E_h$ are both less than zero, then the rendered bitmap is slightly smaller than the original bitmap and no size adjustment is required. If either $E_w$ or $E_h$ is positive, step 190 is implemented, in which horizontal and vertical scale factors are computed and stored for WORD (W). Whenever WORD(W) is to be displayed (assuming it has a high enough confidence level to be recognized), the scale factors adjust the rendered word label to the corresponding size of its original bitmap image. Storing scale factors requires much less space than storing a size-adjusted bitmap. The process is then complete as indicated in step 186.

In an alternate embodiment, other lexical units (text line, text block, page, etc.) in the hierarchy can be rendered and compared to the corresponding portion of the original bitmap as described above. Scale factors can be computed and stored at this time for those lexical units.

Figure 10:
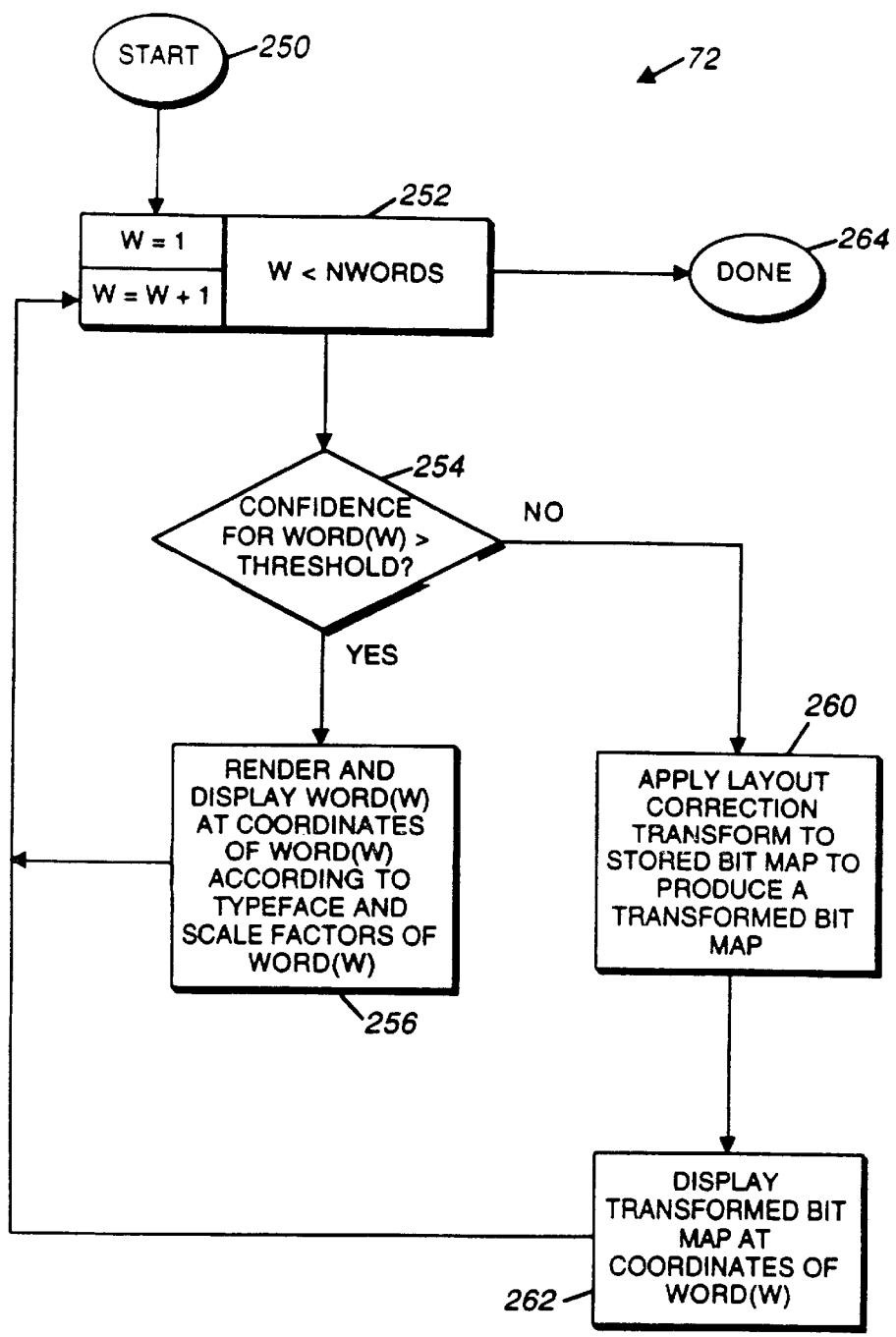
FIG. 10 is a flow diagram illustrating the display hybrid data structure step of FIG. 4.

FIG. 10 is a flow diagram illustrating step 72 of FIG. 4, in which the hybrid data structure of identifiable and non-identifiable objects is displayed. The display process starts at 250. In step 252, word counter variable "W" is initialized to 1 and W is compared to NWORDS, the number of words (both identifiable and non-identifiable) in the hybrid data structure. If W is less than NWORDS, then step 254 is implemented, in which the CPU checks if the confidence level for WORD(W) is greater than the threshold confidence value. If so, then WORD(W) is an identified word, and step 256 is implemented. In step 256, the coded top label of WORD(W) is rendered and displayed at the location specified by the coordinates of WORD(W) according to the assigned typeface and at the appropriate scale factor for WORD(W). In the described embodiment, the microprocessor, or related processor such as a renderer chip, renders character outlines corresponding to characters of WORD(W) into a bitmap for display according to the known characteristics of the word and the typeface assigned to the word. Once WORD(W) has been rendered and displayed, the process returns to step 252, where W is incremented and the next word is processed.

If the confidence level for WORD(W) is not greater than the threshold confidence value in step 254, then WORD(W) is not an identifiable (recognized) object; it is a non-identifiable (unrecognized) object. Step 260 is then implemented, in which the layout correction transformation is applied to the stored non-coded bitmap which is associated with the unrecognized word (or other object) to produce a transformed bitmap. The transformed bitmap has thus been corrected for geometric distortion. In step 262, the microprocessor displays the transformed bitmap as an non-coded raster image at the coordinates of WORD(W). The non-coded image can be displayed on a display screen 16, a printer 18, or other suitable output device; the bitmap can also be scaled appropriately for the given output device resolution. The process then returns to step 252 to increment counter W and display the next word in the hybrid data structure. Once all objects in the hybrid data structure have been displayed (either as coded or non-coded images), the process is complete as indicated in step 264.

Figure 11:
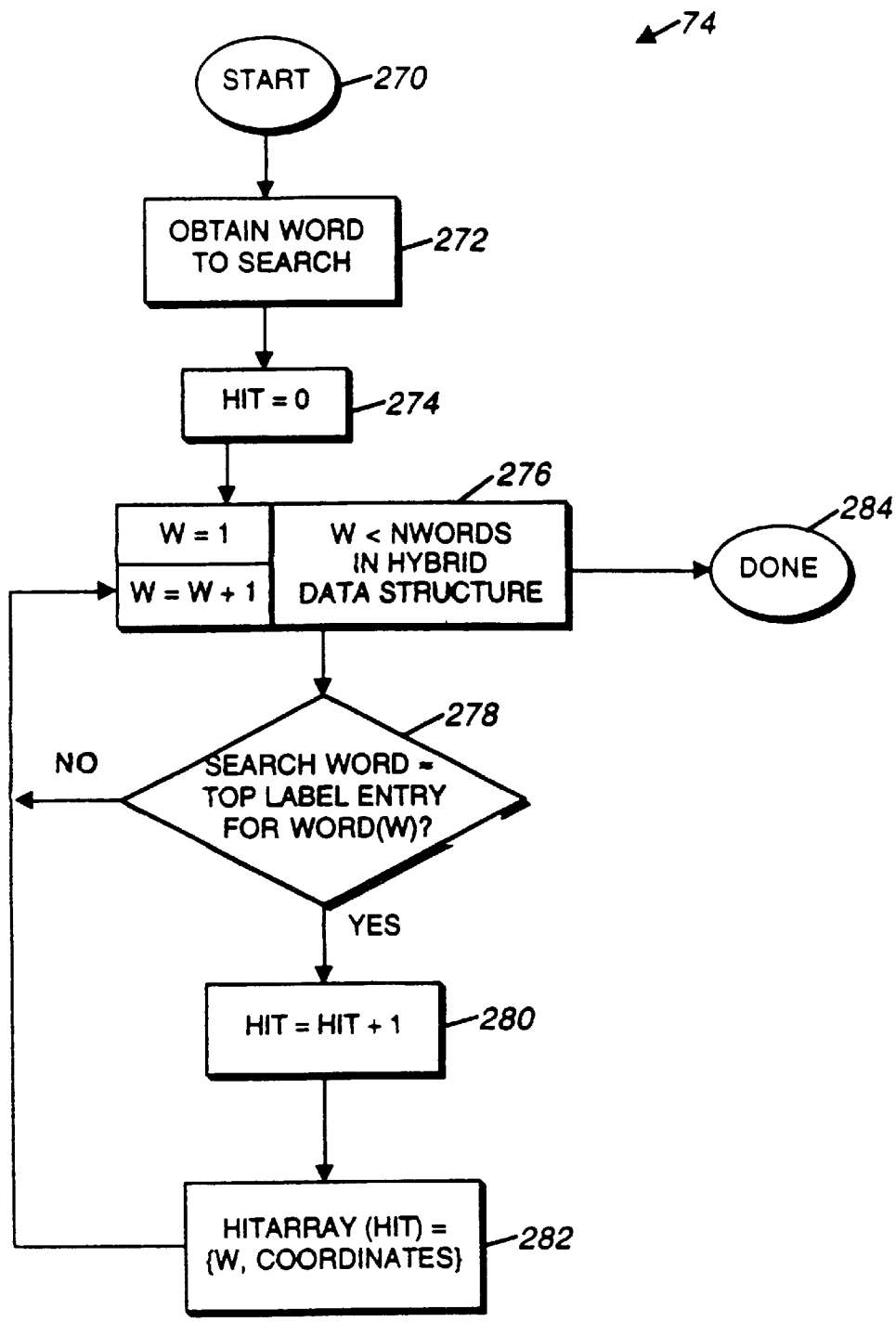
FIG. 11 is a flow diagram illustrating the search hybrid data structure step of FIG. 4.

FIG. 11 is a flow diagram illustrating step 74 of FIG. 4, in which the hybrid data structure is searched. The process begins at 270, and, in step 272, a word (or a number of words, i.e., a phrase) is obtained which is to be used as the search criteria. This search word is typically entered by the user from keyboard 20, or it may be loaded from a file, another computer, an input device, etc. In step 274, the variable HIT is initialized to zero. Variable HIT indicates how many instances of the search word have been found in the hybrid data structure. In step 276, a word counter variable "W" is initialized to 1 and is compared to the number of words NWORD in the hybrid data structure. If W is less than NWORD, step 278 is implemented, in which the microprocessor checks if the search word is approximately equal to the top label entry (label with highest confidence level) for WORD(W). Thus, in the described embodiment, even unrecognized words (or other non-identifiable objects) are compared to the search word even though the unrecognized words do not have confidence levels above the recognition threshold level described in FIGS. 7 and 10. The term "approximately equal," refers to the search word differing in minor ways from WORD(W), such as in uppercase/lowercase letters, yet still being equivalent for search purposes. Other examples of words being approximately equal include words having suffixes such as "-ing" or plural forms of the word which should be matched to the search word.

If the search word is not approximately equal, then the process returns to step 276 to increment W and examine the next WORD(W). If the search word is approximately equal to WORD(W), then step 280 is implemented, in which the variable HIT is incremented. In step 282, the variable HITARRAY(HIT) is set equal to the value of word counter variable W and the coordinates of WORD(W) so that the found word can be displayed or manipulated if necessary (the found word can also be displayed in the editor as described with reference to FIG. 12). The process then returns to step 276 to increment W and examine the next WORD(W). When all words in the document have been searched, the process is complete as indicated in step 284.

In alternate embodiments, the search process as described above can also be implemented in separate application programs which have their own search functions and are well-known to those skilled in the art. For example, Acrobat® by Adobe Systems, Inc., allows a user to search an electronic document having a variety of formats and object type.

In alternate embodiments, the stored hybrid data structure can be adapted to conform with a pre-existing "standard" format for document storage. For example, Acrobat includes a Portable Document Format (PDF). The hybrid data structure can be stored in this format by storing recognized word labels as coded text (e.g., in PostScript) and unrecognized word labels as both non-coded bitmaps and as "invisible" text to enable searching. That is, the unrecognized word objects (i.e., the word label in a list having the highest confidence) can be displayed, but have the same color as the background to appear "invisible" and allow the non-coded bitmap to be displayed over the unrecognized words. The invisible word objects can still be compared to the search word and located by an error-tolerant search mechanism, and/or edited if desired (described below).

Figure 12A:
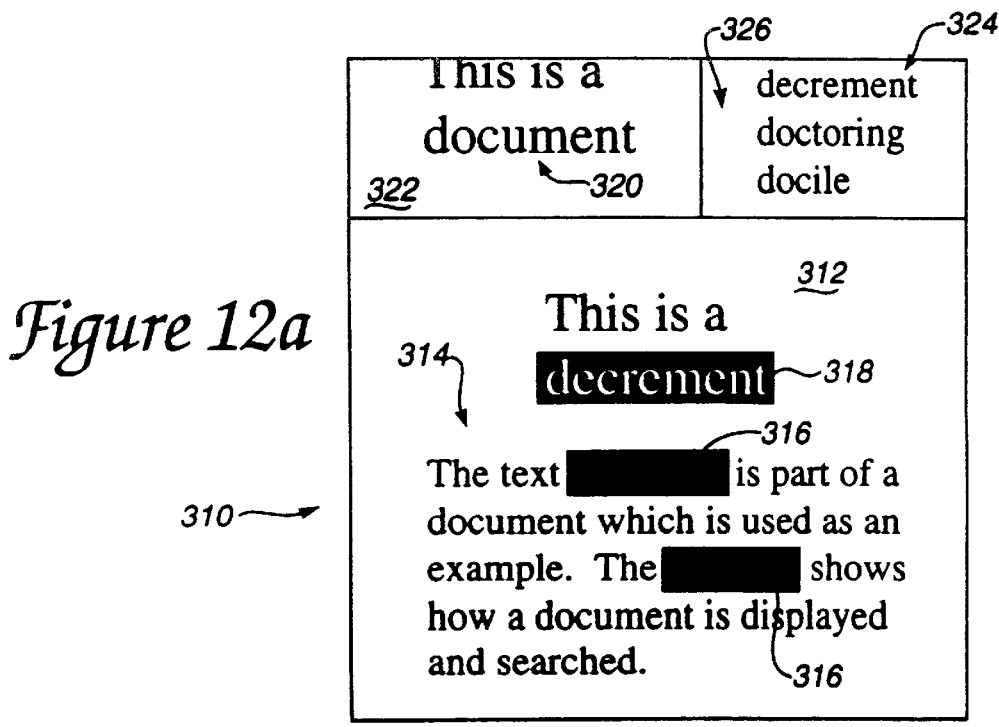
FIG. 12a is a diagrammatic illustration of a portion of a display screen and editor showing the editing of a hybrid data structure.
Figure 12:
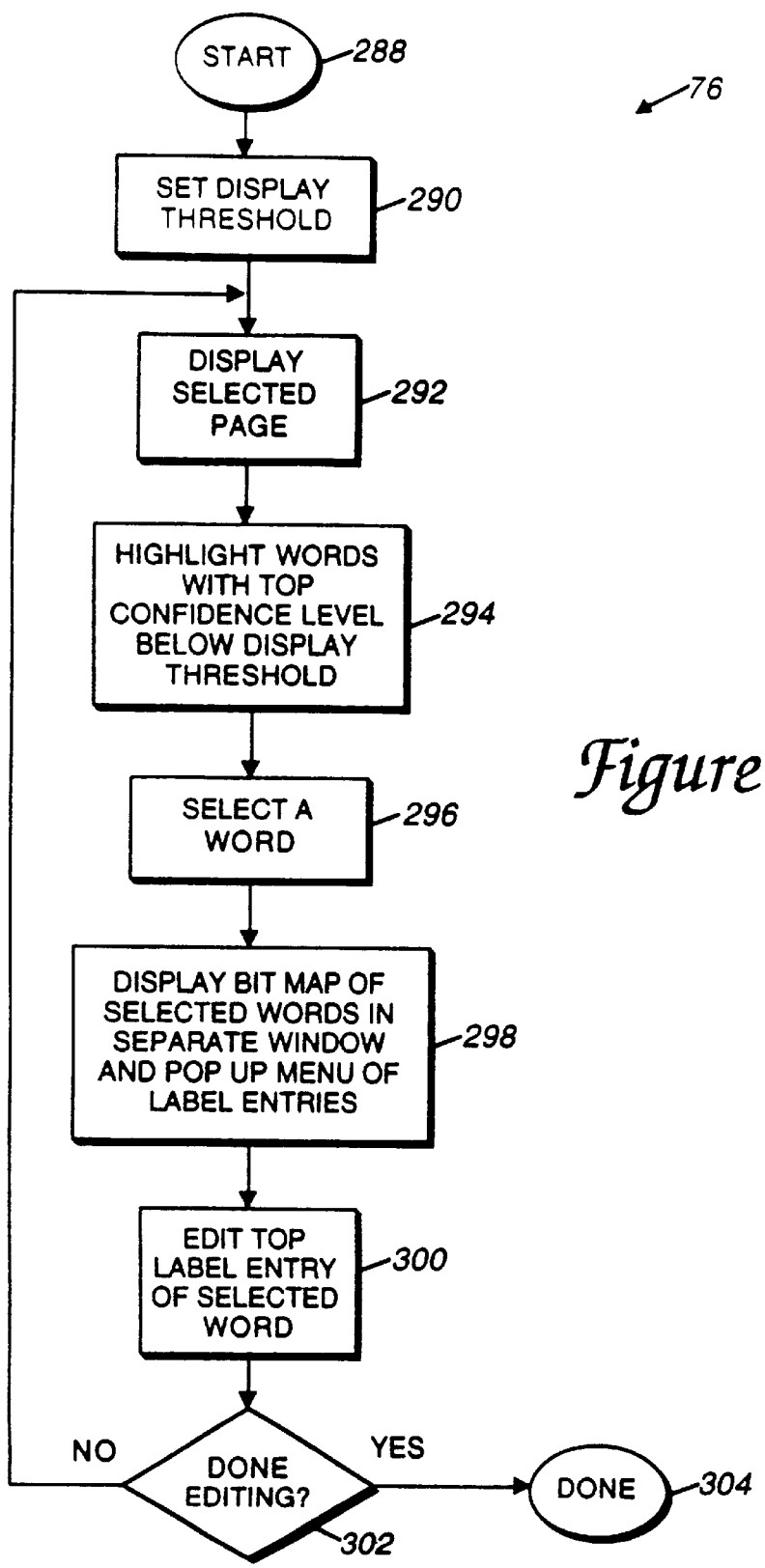
FIG. 12 is a flow diagram illustrating the edit hybrid data structure step of FIG. 4.

FIG. 12 is a flow diagram illustrating step 76 of FIG. 4, in which the hybrid data structure is edited to reduce the number of non-identifiable objects in the structure. The method can be implemented with an editor text window (shown in FIG. 12a) which always displays coded word labels, regardless of the label's confidence level, and does not display non-coded bitmaps. Displayed word are highlighted according to the relation of each word label's confidence level to a user controlled display threshold confidence level. The display threshold level allows the user to preview the results when the hybrid data structures confidence threshold is changed. It also allows the user to optimize the number of words that need examination for possible error correction.

The process starts at 288. In step 290, a display threshold value is set by the user. In step 292, the selected page is displayed, preferably on a display screen. That is, the user selects which page, or portion of a page, he wishes to view. The user can specify this in an interface, such as the interface described below with respect to FIG. 12a. In step 294, the microprocessor highlights the displayed words which have a top label entry that has a confidence level below the display confidence level. Highlighting can mean displaying a word in inverse video (e.g. white letters on a colored or shaded background) or displaying the word in a distinct or different color, font, etc. The user can thus identify at a glance which words have a confidence level below the display threshold level. At an optimal display threshold value, most of the highlighted words contain recognition errors and all of the unhighlighted words are correctly recognized.

In step 296, the user selects a word which he wishes to edit. This can be accomplished in several ways, such as using a keyboard, a mouse, stylus, etc. In step 298, the processor displays the original bitmap portion corresponding to the word and a portion of the surrounding area of the original bitmap, preferably in a separate window. In addition, a "pop up menu" of all or some of the label entries associated with the selected word which were stored in the hybrid data structure are displayed in the separate window (or a different window). The user thus is permitted to view the stored guesses made by the recognizer for a word. In step 300, the user edits the top label entry of the selected word to correct a misrecognized word. The user can simply type in the correct word, which can often be surmised by looking at the displayed original bitmap image of the word. The user can also select one of the other label entries in the displayed list of label entries, which will substitute the top label entry with the selected label entry. After the user has changed a word, the top label entry for that word is automatically assigned a confidence level of 100%. Once the word has been edited, the microprocessor checks if the user is finished editing in step 302. If not, the process returns back to step 292 to display a selected portion of the hybrid data structure. If the user is finished, the process is complete as indicated in step 304.

FIG. 12a is a diagrammatic illustration of a screen display showing an editing interface 310 of the described embodiment. This interface is displayed by the display manager which controls the display, edit, and search functions. Editing window 312 is used to display pages or portions of pages of the hybrid data structure to the user to view. Text 314 includes all words of the hybrid data structure in their word label (coded) form. Words 316 have confidence levels below the display threshold level and are highlighted to indicate that they may contain errors. Word 318 is both highlighted as a low-confidence word and is also highlighted as a word currently selected by the user (words 316 and 318 can be displayed as different colors, patterns, etc.) The associated original image 320 from the vicinity of word 318 in the input raw bitmap is displayed in window 322. In the described embodiment, displayed label list 324 including all the stored label entries for selected word 318 is shown in window 326. In an alternate embodiment, the user can select how many of the stored labels are displayed in list 324 (if more than one label is stored in the hybrid data structure). A confidence level for each label entry in list 324 can also be displayed if desired by the user.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. An electronic document comprising:
    an image raster representation of a document page, where display of the image raster representation generates a perceptible image of the document page, the image raster representation having a hybrid data structure including:
        a non-aided representation of the document page, the non-coded representation comprising bitmap representations of non-identifiable lexical objects within the document page, non-identifiable lexical objects being lexical objects having an assigned recognition confidence level below a threshold level;
        a coded representation of the document page, the coded representation comprising codes corresponding to identifiable lexical objects within the document page, identifiable lexical object being lexical objects having an assigned recognition confidence level at or above the threshold level, the recognition confidence level being assigned to the object by a character recognition process; and linking information associating each code with a corresponding area of the image raster representation for identifying a matched area of the image raster representation corresponding to a code that has been matched to a search word, wherein:

the coded representation comprises a page description language description of a hidden page, the hidden page being a representation of the document page;

each code comprises coded text;

the position of the coded text on the hidden page being the same as the position of the corresponding lexical object on the image raster representation; and the linking information for each identifiable lexical object comprises the position of the coded text of the lexical object on the hidden page.

2. The electronic document of claim 1, wherein the linking information for each identifiable lexical object comprises a bounding box of the coded text of the lexical object on the hidden page.

3. The electronic document of claim 1, wherein the matched area is displayed as a highlighted area of the input raster representation.

4. The electronic document of claim 1, wherein the codes include coded text in Postscript format.

5. The electronic document of claim 1, wherein the codes include ASCII character codes.

6. The electronic document of claim 1, wherein the image raster representation of the document page is a PDF format.

7. The electronic document of claim 1, wherein the image raster representation of the document page may be displayed in a first display mode or a second display mode, the first display mode displaying the image raster representation of the document page without displaying the coded representation of the document page, and the second display mode displaying selected codes over the non-coded representation of the document page.

8. A method for displaying an electronic document, comprising:

receiving an input raster representation of a document page;

receiving a non-coded representation of the document generated from the input raster representation, the non-coded representation comprising bitmap representations of lexical objects within the document page;

receiving a coded representation of the document page generated from the input raster representation, the coded representation comprising codes corresponding to identifiable lexical objects within the document page;

receiving linking information associating each code with a corresponding area of the image raster representation for identifying a matched area of the image raster representation corresponding to a code that has been matched to a search word;

putting into effect one of a first display mode and a second display mode; and displaying the input raster representation of the document page without displaying the coded representation of the document page while the first display mode is in effect, and displaying selected codes over the input raster representation while the second display mode is in effect.

9. The method of claim 8, wherein displaying the electronic document comprises displaying the document page on a printing device.

10. The method of claim 8, wherein displaying the electronic document comprises displaying the document page on a display screen.

11. A method for displaying an electronic document, comprising:

receiving an input raster representation of a document page;

receiving a non-coded representation of the document generated from the input raster representation, the non-coded representation comprising bitmap representations of lexical objects within the document page;

receiving a coded representation of the document page generated from the input raster representation, the coded representation comprising codes corresponding to identifiable lexical objects within the document page;

receiving linking information associating each code with a corresponding area of the image raster representation for identifying a matched area of the image raster representation corresponding to a code that has been matched to a search word;

putting into effect a first display mode or a second display mode;

while the first display mode is in effect, displaying the input raster representation of the document page without displaying the coded representation of the document page and highlighting the matched area of the input raster representation in the displayed input raster representation; and while the second display mode is in effect, displaying selected codes rendered as images in place of corresponding areas of the input raster representation, and highlighting the matched area in the display.

12. The method of claim 11, wherein displaying the electronic document comprises displaying the document page on a printing device.

13. The method of claim 11, wherein displaying the electronic document comprises displaying the document page on a display screen.

14. A method for generating an electronic document, comprising:

receiving an input raster representation of a document page;

performing a character recognition process on the input bitmap to identify lexical objects within the document page;

assigning a confidence level to each identified lexical object;

generating a non-coded representation of the document generated from the input raster representation, the non-coded representation comprising bitmap representations of lexical objects within the document page having an assigned confidence level below a threshold level;

generating a coded representation of the document page generated from the input raster representation, the coded representation comprising codes corresponding to lexical objects within the document page having an assigned confidence level at or above the threshold level; and generating linking information associating each code with a corresponding area of the image raster representation for identifying a matched area of the image raster representation corresponding to a code that has been matched to a search word.

15. A system for generating an electronic document, comprising:

means for receiving an input raster representation of a document page;

means for performing a character recognition process on the input bitmap to identify lexical objects within the document page;

means for assigning a confidence level to each identified lexical object;

means for generating a non-coded representation of the document generated from the input raster representation, the non-coded representation comprising bitmap representations of lexical objects within the document page having an assigned confidence level below a threshold level;

means for generating a coded representation of the document page generated from the input raster representation, the coded representation comprising codes corresponding to identifiable lexical objects within the document page having an assigned confidence level at or above the threshold level; and means for generating linking information associating each code with a corresponding area of the image raster representation for identifying a matched area of the image raster representation corresponding to a code that has been matched to a search word.

16. A computer program product, tangibly stored on a computer-readable medium, for displaying an electronic document, the product comprising instructions operable to cause a programmable process to:

receive an input raster representation of a document page;

receive a non-coded representation of the document generated from the input raster representation, the non-coded representation comprising bitmap representations of unidentifiable lexical objects within the document page;

receive a coded representation of the document page generated from the input raster representation, the coded representation comprising codes corresponding to identifiable lexical objects within the document page;

receive linking information associating each code with a corresponding area of the image raster representation for identifying a matched area of the image raster representation corresponding to a code that has been matched to a search word;

put into effect a first display mode and a second display mode;

display the input raster representation of the document page without displaying the coded representation of the document page while a first display mode is in effect, and display selected codes over the input raster representation while a different display mode is in effect.

17. An apparatus for producing a hybrid data structure from an input raster image which has been scanned and converted to an input bitmap, the hybrid data structure including coded portions which represent all of the identifiable objects contained within a first part of the input bitmap and a non-coded second part of the input bitmap representing non-identifiable objects, the coded portions themselves being capable of conversion to bitmap representations of the identifiable objects without access to external data, said apparatus comprising:

means for performing a recognition process on the input bitmap;

means for representing the identifiable objects as coded data; and means for creating the hybrid data structure that may be used to reproduce the input raster image, wherein the hybrid data structure has two parts, a first part corresponding to the first part of the input bitmap that incorporates solely the coded portions, and a second part corresponding to the non-coded second part of the input bitmap that incorporates solely the non-coded second part of the input bitmap, and wherein the hybrid data structure, without access to external data, is sufficient to reproduce the entire input raster image, wherein the means for creating the hybrid data structure further includes means for assigning a recognition confidence level to each object such that the identifiable objects are objects having a confidence level at or above a threshold level, and the non-identifiable objects are objects having a confidence level below a threshold level.

* * * * *

UNITED STATES PATENT AND TRADEMARK OFFICE
CERTIFICATE OF CORRECTION

PATENT NO. : 6,661,919 B2  
DATED : December 9, 2003  
INVENTOR(S) : Dennis G. Nicholson and James C. King It is certified that error appears in the above-identified patent and that said Letters Patent is hereby corrected as shown below:

Column 20,
Line 60, replace "non-aided" with -- non-coded --.

Signed and Sealed this

Fifteenth Day of June, 2004

JON W. DUDAS
*Acting Director of the United States Patent and Trademark Office*